US010079865B2

(12) United States Patent
McDaid et al.

(10) Patent No.: US 10,079,865 B2
(45) Date of Patent: Sep. 18, 2018

(54) METHOD AND SYSTEM FOR AN ONTOLOGY BASED REQUEST/REPLY SERVICE

(71) Applicant: Software AG USA Inc., Reston, VA (US)

(72) Inventors: Eddie McDaid, Hertford (GB); Desmond Chan, Sunnyvale, CA (US); Terence G. Kennedy, Darmstadt (DE); Dieter Kessler, Darmstadt (DE)

(73) Assignee: Software AG USA Inc., Reston, VA (US)

( * ) Notice: Subject to any disclaimer, the term of this patent is extended or adjusted under 35 U.S.C. 154(b) by 870 days.

(21) Appl. No.: 14/574,974

(22) Filed: Dec. 18, 2014

(65) Prior Publication Data
US 2016/0182433 A1   Jun. 23, 2016

(51) Int. Cl.
*H04L 12/58* (2006.01)
*H04L 29/06* (2006.01)

(52) U.S. Cl.
CPC ............ *H04L 65/403* (2013.01); *H04L 51/14* (2013.01); *H04L 65/4015* (2013.01)

(58) Field of Classification Search
CPC .... H04L 65/4015; H04L 65/403; H04L 51/14
See application file for complete search history.

(56) References Cited

U.S. PATENT DOCUMENTS 5,329,619 A * 7/1994 Page ...................... G06F 9/546
707/999.104

7,945,896 B2    5/2011  Rousselle
8,301,687 B2   10/2012  Rokicki et al.
2001/0039562 A1* 11/2001 Sato .................. G06F 17/30545
709/202
2005/0050173 A1*  3/2005 Kikuchi ............ G06F 17/30867
709/219
2005/0228677 A1* 10/2005 McCabe ................ G06Q 10/02
705/5
2006/0223518 A1* 10/2006 Haney ................ H04M 3/4228
455/420
2010/0125855 A1*  5/2010 Ferwerda .............. G06F 9/5027
719/317

(Continued)

*Primary Examiner* — Shean Tokuta
*Assistant Examiner* — Juan C Turriate Gastulo
(74) *Attorney, Agent, or Firm* — Posz Law Group, PLC

(57) ABSTRACT

In a method, system, or computer-readable medium for an ontology-based request/reply service (RRS), different request/reply services (RRS) are hosted, each different RRS dedicatedly represents a different unique service and provides connections from client to server instance of the unique service, each different RRS accessed by client and server instances through a same independent communication layer (ICL). A request from the client is received through the ICL. The RRS is determined by the unique service indicated in the request, and instantiated dynamically as needed, according to an individual RRS ontology which establishes a syntactical and semantical framework dedicated to the unique service. The request is routed to the RRS and then through a server instance of the unique service to process the request; then a response is returned to the client to satisfy the request. It provides transport connectivity and mutual communication between combinations of clients, different RRSs, and server instances.

20 Claims, 13 Drawing Sheets

(56) References Cited

U.S. PATENT DOCUMENTS

| | | | | |
|---|---|---|---|---|
| 2010/0191796 A1* | 7/2010 | Almeida | ............... | G06F 9/5027 |
| | | | | 709/202 |
| 2013/0332782 A1* | 12/2013 | Christena | ................ | G06F 11/32 |
| | | | | 714/57 |
| 2014/0040466 A1* | 2/2014 | Yang | ......................... | H04L 1/22 |
| | | | | 709/224 |
| 2014/0067759 A1* | 3/2014 | Aguilera | ........... | G06F 17/30212 |
| | | | | 707/610 |

\* cited by examiner

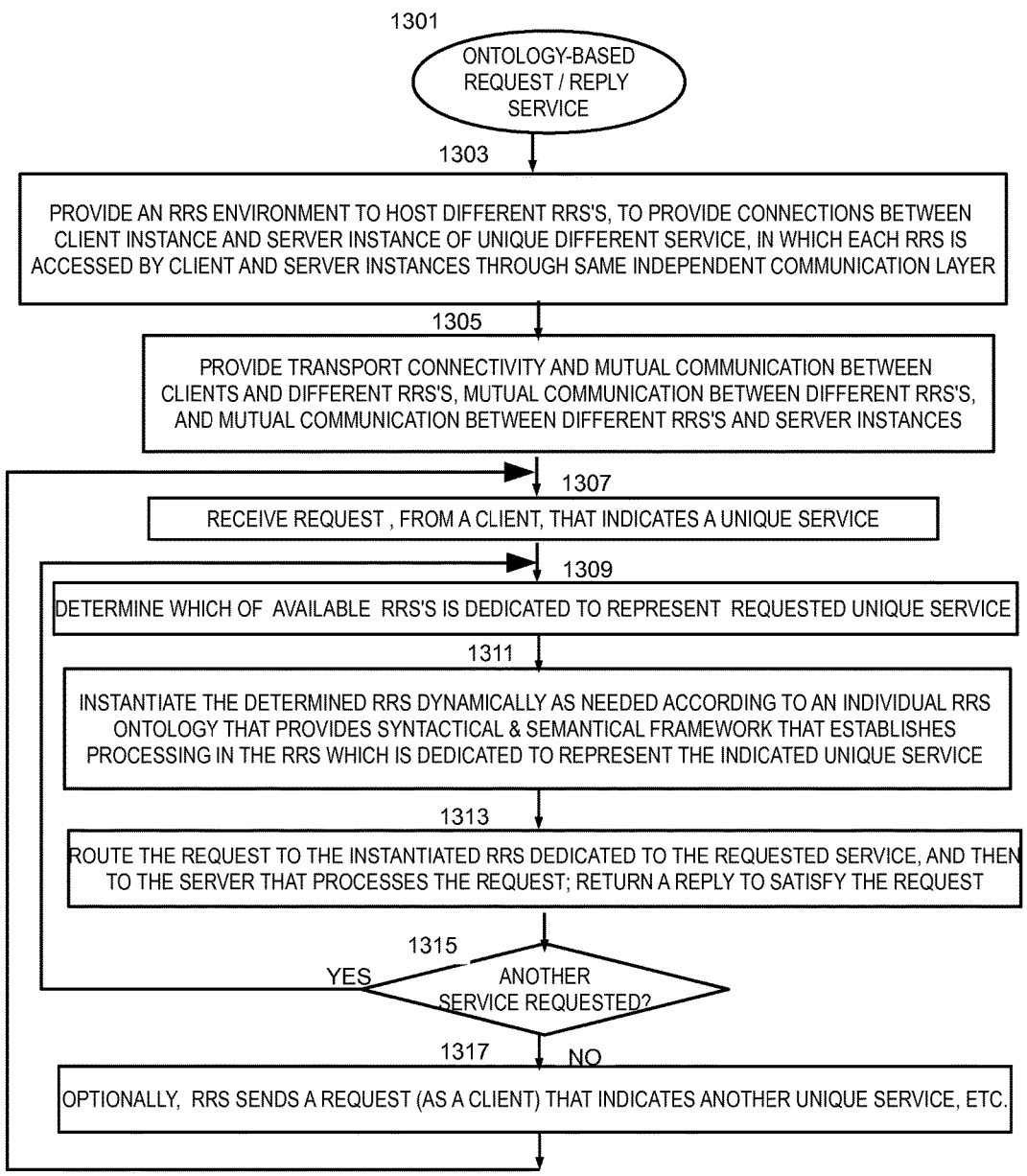

METHOD AND SYSTEM FOR AN ONTOLOGY BASED REQUEST/REPLY SERVICE

TECHNICAL FIELD

The technical field relates in general to message-oriented middleware, and more particularly to publish-subscribe infrastructures.

BACKGROUND

Many modern applications (e.g. web-based services) require exceptionally correctness and highly responsive times and in addition the system providing these services must operate in a very correctly performing manner in a distributed environment.

Many modern applications, for example, web-based services, are based on request-reply services for their communication with clients or use a middleware component (that is, a form of Broker) to provide this communication across a distributed system.

Request-reply services (RRS) enable the clients to make requests to a specific service and attain responses. Request-reply is a message exchange pattern in which a requestor sends a request message to a replier system, which receives and processes the request, ultimately returning a message in response. This pattern is typically carried out over one channel.

The available RRS's typically require the users to provide functionalities in the context of pre-determined application programming interfaces (APIs) without extensibility. There is no means to capture the structure of a new set of functionalities in an object-oriented fashion. Applications implemented on top of the classic RRS's lack the capability to share functionalities. This leads to, among other things:
  Complex applications
  Inability to decompose functionalities into specific modules
  Inability to share code
  Inability or complication to implement specific security policies in different contexts
  Inability or complications to implement specific throttling policies in different contexts
  For instance, a travel agency API may combine conventional functionalities to book:
  a flight
  a hotel room
  a rental car
However, the functionalities are not shared, leading to the problems outlined above.

SUMMARY

Accordingly, one or more embodiments provide a method, computer device and/or non-transitory computer readable medium for an ontology-based request/reply service (RRS). A processor hosts a plurality of different request/reply services (RRS), each different RRS is dedicated to represent a different unique service and to provide connections from a client to a server instance of the different unique service, each different RRS is accessible by client instances and server instances through a same independent communication layer (ICL) that handles different transport protocols between different platforms. Also, the processor receives, from the client through the ICL, a request that indicates a unique service, and determines which RRS of the different RRSs is dedicated to represent the unique service which is indicated in the request. The processor instantiates an RRS of the different RRSs dynamically as needed, the RRS being instantiated according to an individual RRS ontology stored in an RRS ontology provided in a storage, wherein the individual RRS ontology provides a syntactical and semantical framework to establish processing which is dedicated to represent the unique service. The processor routes the request which is received, to the instantiated RRS of the different RRSs which is determined to be dedicated to represent the unique service which is indicated in the request, and then the processor routes the request through a server instance corresponding to the unique service indicated in the request, to process the request and then the processor returns, to the client, a response to satisfy the request. Further, the processor manages transport connectivity and mutual communication between a plurality of clients and the plurality of different RRSs, mutual communication between the plurality of different RRSs, and mutual communication between the plurality of different RRSs and a plurality of server instances.

Another embodiment includes the processor removing one or more of the plurality of different RRSs when no longer needed to process requests.

In another embodiment, the RRS ontology is configured to cause the instantiated RRS, executing by the processor, to support a plurality of parallel requests through the plurality of server instances all dedicated to the unique service.

In still another embodiment, the RRS ontology is configured to cause the RRS, executing by the processor, to limit responses to the client request to a predefined maximum number of responses, when the client request is to the plurality of server instances which cause more than the predefined maximum number of responses to the client request.

In a further embodiment, the individual RRS ontology in the RRS ontology causes the instantiated RRS, when executing by the processor, to act as a client that communicates requests to and receives replies from at least one of the different RRSs.

Still a further embodiment also includes the processor managing requests and replies between the plurality of clients and the plurality of different RRSs according to pre-defined different types of conversation styles.

Yet a further embodiment includes receiving, by the RRS on the processor, registration from the server instance, wherein the registration includes an indication of a rollback strategy in the event that the server instance disconnects while processing at least one unfinished request.

Yet one more embodiments includes the processor providing accessibility to each different RRS through a common application programming interface (API) which is common to all of the different RRSs.

It should be noted that also disclosed herein are a system and non-transitory, computer readable storage medium featuring the functionality immediately-above described.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 13 is a flow chart illustrating a procedure for an ontology-based RRS.

DETAILED DESCRIPTION

I. Introduction

Figure 1:
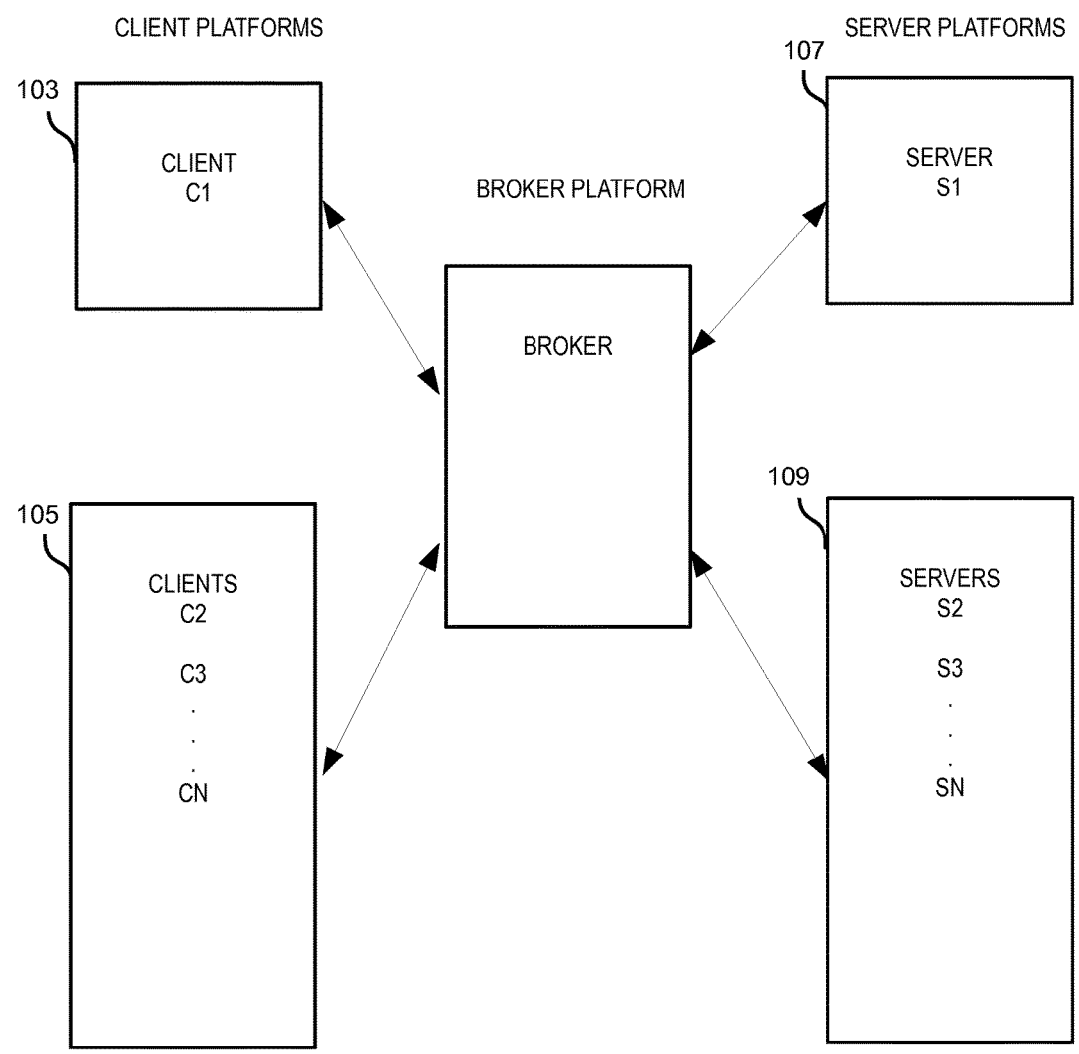
FIG. 1 is a block diagram illustrating architecture of a broker mechanism.

In overview, the present disclosure concerns a request/reply messaging paradigm which can meet a demand for a request/reply (i.e. remote procedure call (RPC)) behaviour, which can be implemented with the least possible effort, while retaining the benefits of a strong, e.g., server-type, environment. More particularly, various inventive concepts and principles are embodied in systems, devices, and methods therein for a messaging paradigm which utilizes an ontology to provide a framework for individual request/reply services each of which is directed to a unique, different service and can be instantiated as needed based on the ontology, so as to offer an interface that works with well-matured client and/or server products and can offer additional features, but which can overcome the deficiencies such as the overhead and lack of flexibility of a classic broker-based system.

As further discussed herein below, various inventive principles and combinations thereof are advantageously employed to provide novel features (e.g., ontology and interchangeable communication of RRSs) which are not available in known systems. Furthermore, orchestration of multiple services within a managed Request/Reply Service (RRS) environment is a completely new approach, which can improve the performance of the overall "main" service. Moreover, the delegation of providing the syntactical and semantical framework to an ontology (where ontologies are not limited to merely rule execution) adds a different and, in certain cases, a new beneficial design concept for writing a client/server application.

Further in accordance with exemplary embodiments, methods, systems, and devices are provided in which the architecture can utilize Request/Reply Service objects, which represent a unique instance of a specific service; these instances can connect a request client with a reply service. Moreover, logic is provided in the RRS objects by adding 1) an ontology connection and 2) allowing the RRSs to communicate interchangeably with each other. Accordingly, at least two advantages may be gained: 1) client requests that require multiple service connections can gain significant performance by moving the interactive logic from a service into the ontology; and 2) since the logic that deals with the connectivity of multiple services is now part of an ontology, there can now be provided a single central point to handle most of the RRS process (the so-called "RRS process environment), which is particularly advantageous if the logic needs to be adjusted, and which can be transparent to the client and the server.

II. Context—Observations

While the current common terminology referring to how web-based services offer communication between their clients and services is sometimes generically referred to as "RRS", one of the most prevalent technologies in use is based on technology developed in the early 1990s. This conventional technology is based on the concept of a middleware component commonly referred to as a Broker. The Broker acts as an intermediary, according to conventional techniques, between the requestor/client and the service provider/server (in this case the web server may fulfill the role of the Broker) and can provide several mechanisms for communication, including those commonly referred to as:

Synchronous and Asynchronous message communication between client and server

RPC (Remote Procedure Call)

Publish & Subscribe (Pub-Sub)

Fire & Forget

In addition, as is known, many of these Broker-based mechanisms offer persistence of the messages, guaranteed delivery, and transparent communication between requestor/client and provider/server. While Broker-based solutions are comprehensive solutions for most distributed applications, the inventors observe that Broker-based mechanisms do have some disadvantages in certain circumstances, which may be significant, as will be explained shortly.

Figure 2:
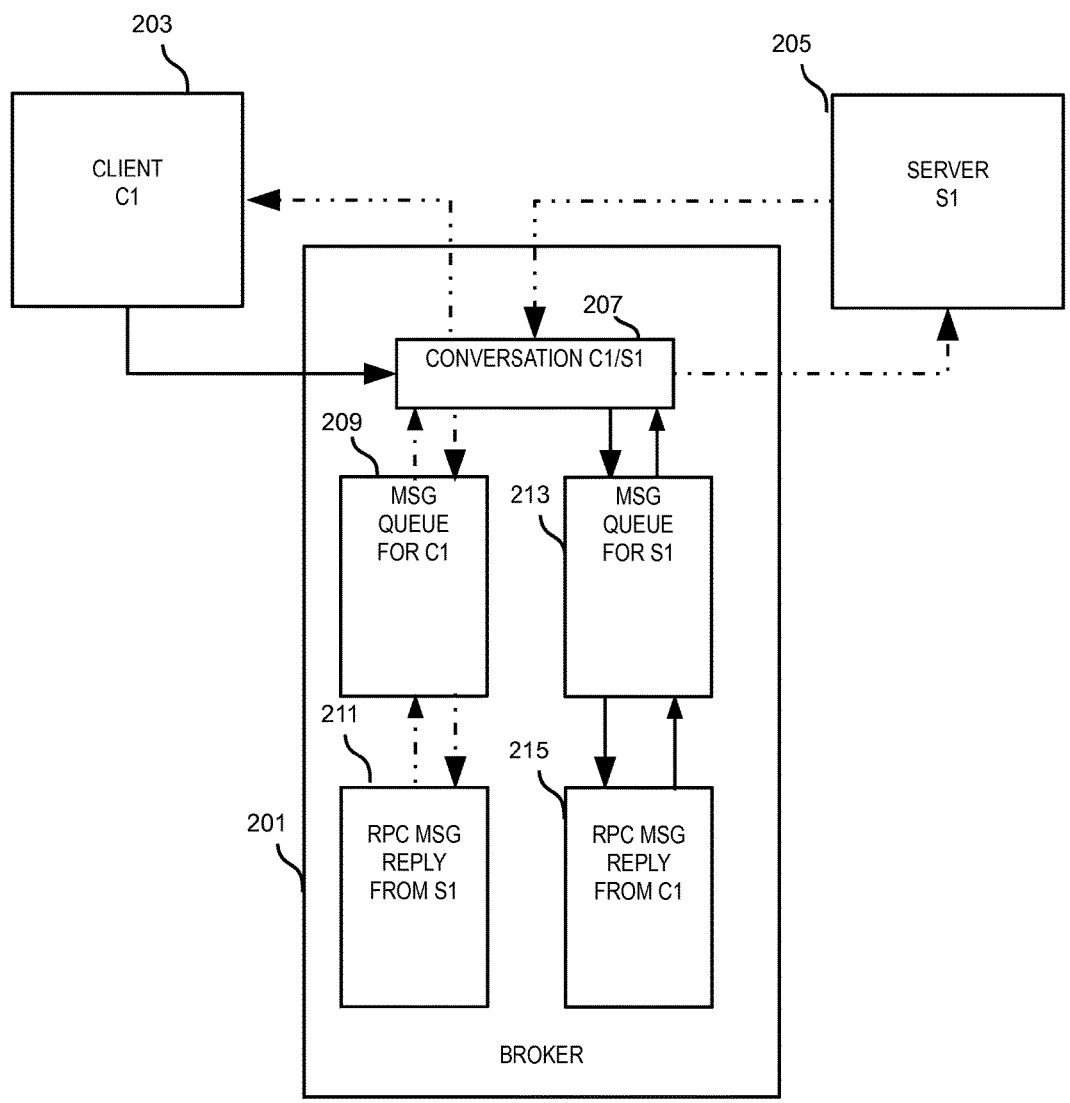
FIG. 2 is a block diagram illustrating overhead of a RPC call through the broker mechanism.
Figure 3:
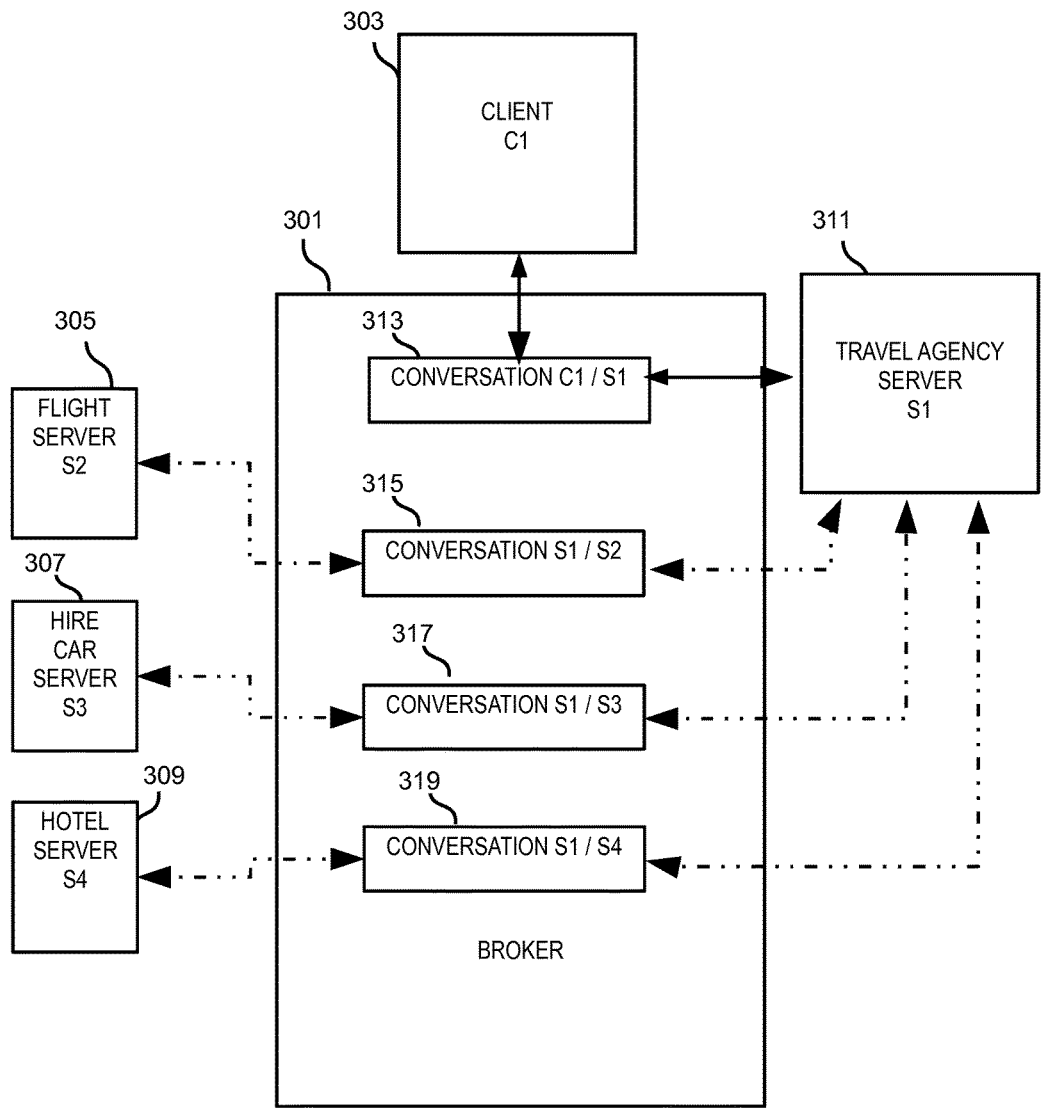
FIG. 3 is a block diagram illustrating multiple server coordination through the broker mechanism.

The typical architecture of a conventional Broker based solution is illustrated in FIG. 1, and problems observed in connection with the typical architecture are discussed in the subsequent section in connection with FIG. 2 (illustrating overhead which is incurred by this architecture) and FIG. 3 (illustrating multiple server coordination for a client request, which degrades performance and responsiveness).

In FIG. 1, a broker platform has a broker 101 which communicates with client platforms including client C1 103 and other clients C2, C3 . . . Cn 105; the broker 101 also communicates with server platforms including server S1 107 and other servers S2, S3 . . . Sn 109. Note that the Requestor (also referred to as a "client") 103, 105, Provider (also referred to as a "server") 107, 109 and the Broker 101 can be on multiple separate platforms or on the same platform or any combination thereof.

An example of a general architecture for a broker can be found in U.S. Pat. No. 5,329,619, "Cooperative Processing Interface and Communication Broker for Heterogeneous Computing Environments". A Java-based implementation supporting standards can be found in U.S. Pat. No. 8,301, 687, "Systems and/or Methods for Standards-based Messaging."

III. Problem Presentation

There are problems with the current approaches to Broker usage. One problem with conventional Broker usage is that the Broker is designed to be stand-alone (that is, a separate entity that provides the connecting middleware between requestor/client and provider/server). Although being stand-alone is frequently acceptable, in a broadly distributed scenario in which the Broker is providing and managing multiple connections and providing different methods of communication, the Broker usage does so at a price. Some of the issues are as follows:

Administration overhead is excessive

Performance overhead in dedicated environments is excessive

As is known, a Broker provides multiple forms of communication. FIG. 2 uses a conventional RPC as representative of such communication, and illustrates Broker RPC handling and the overhead of a simple RPC call. In FIG. 2, a client C1 203 communicates with a server S1 205 through a broker 201. The broker 201 includes a message queue 209 for the client C1, and a message queue 213 for the server S1. An RPC call from the client 203 is received at the broker 201 which, based on a type of requested service in the RPC call, establishes a conversation 207 between the client 203 and the server 205.

FIG. 2 illustrates, that in order to deal with the RPC call, the Broker 201 (whose mechanism is based on the capacity to handle more complex communication scenarios involving multiple concurrent messages) incurs the overhead of establishing a set of queues 209, 213 to store the information respectively from the requestor/client 203 and the reply from the provider/server 205 during the RPC call. An RPC message 215 from the client 203 is placed into the message queue for S1 213 before being transmitted by the broker 201 to the server 205. An RPC message reply 211 from the server 205 (in response to the RPC message 215 from the client) is stored into the message queue 209 for the client, and then is sent to the client 203. While this is a simplistic scenario, it serves to illustrate the overhead incurred when a tool designed for complex communication is used for more simple tasks.

There are some scenarios where good performance is desirable and quick response time is vital. The system, method, computer-readable medium, and principles disclosed in this document can overcome these problems of overhead as well as offering other correctly performing solutions when response is vital.

Besides the needless overhead, there are also scenarios when the conventional Broker just cannot fulfill the needs of the requestor/client. One such important scenario is when the requestor/client sends a request to multiple providers/servers simultaneously but is only interested, for example, in the first response. In this case (i.e. a Brokered solution) extra coding would be required in either the Broker or the requestor/client to deal with the unwanted replies. This is a very unsatisfactory solution and one which current Brokers do not handle well, if at all.

To fulfill a typical requestor/client request (such as the foregoing Travel Agency example involving a flight, hire car and hotel room), multiple different providers/servers need to be coordinated. (The Travel Agency example is used to illustrate several points, but it is understood that this is merely a convenient and easily comprehended example of multiple different providers/servers each of which offer a unique service, and that the embodiments are not limited to travel agencies.) FIG. 3 is a simplified diagram that illustrates multiple server coordination through the broker mechanism, using the travel agency example, in which there is a client C1 303, a broker 301, a travel agency server S1 311; the travel agency server s1 311 itself will call a flight server S2 305, a hire car server S3 307, and a hotel server S4 309. In the case of a conventional Broker solution this would involve the primary provider/server (the Travel Agency server) issuing requests to the other providers/servers (in this example, one each for flight, car hire and hotel). (In FIG. 3, the queues associated with each conversation, discussed above, are understood to be present but are omitted for ease of illustration.) To do this, in response to the conversation 313 begun by the client C1 303, the travel agency provider/server 311 must issue requestor/client requests to each of the other providers/servers 305, 307, 309 for the flight server, hire car server, and hotel server, as shown in FIG. 3, regarding broker multiple server coordination for a client request. This involves multiple round trips through the Broker with the resultant performance/response problems due to the messaging as discussed above.

It will be appreciated in this typical scenario using a conventional broker, the conventional primary provider/server splits the complex request from the client into its atomic parts each of which relates to a particular service, and then must coordinate with other provider/servers implicated by each of the atomic parts, so as to achieve the result required by the original requestor/client. In the example of FIG. 3, to do this the primary provider/server (the Travel Agency server 311) must act itself as a requestor/client with respect to the broker 301, and the Travel Agency Server S1 311 must do multiple complete round trips completely through the Broker 301 with all of the attendant overhead. The Broker 301 typically shields the knowledge of where the provider/servers are so that the broker can maintain its transparent communication in a distributed environment. However, in some cases where response time and performance are essential, this introduces a significant overhead. The mechanism explained herein overcomes this problem and others.

IV. Aspects of the Approach

A. Concept

The problem as discussed in the above section is one of performance and response in circumstances when the conventional approaches (for example, Broker, RPC and so on) do not function adequately. The concept here to solve the problem takes the approach that in a totally managed environment where performance and response are paramount, what is needed is a dedicated set of RRS servers (that is, a particular server is dedicated to a single service (and no other service) that is required) that are either pre-configured or dynamically activated/loaded that can deal with requestor/client requests by connecting the client to an appropriate provider/server instance transparently, efficiently and with minimal if any extra programmable logic in the requestor/client to deal with the connection, transport protocols and/or manageability of the request, where the request may further include, for example, independent transport, common API, deletion of spurious replies, and the like. The dedicated RRSs may exist, for example, in a central RRS Process Environment, accessible to requestors/clients and connected to appropriate providers/server instances.

Figure 4:
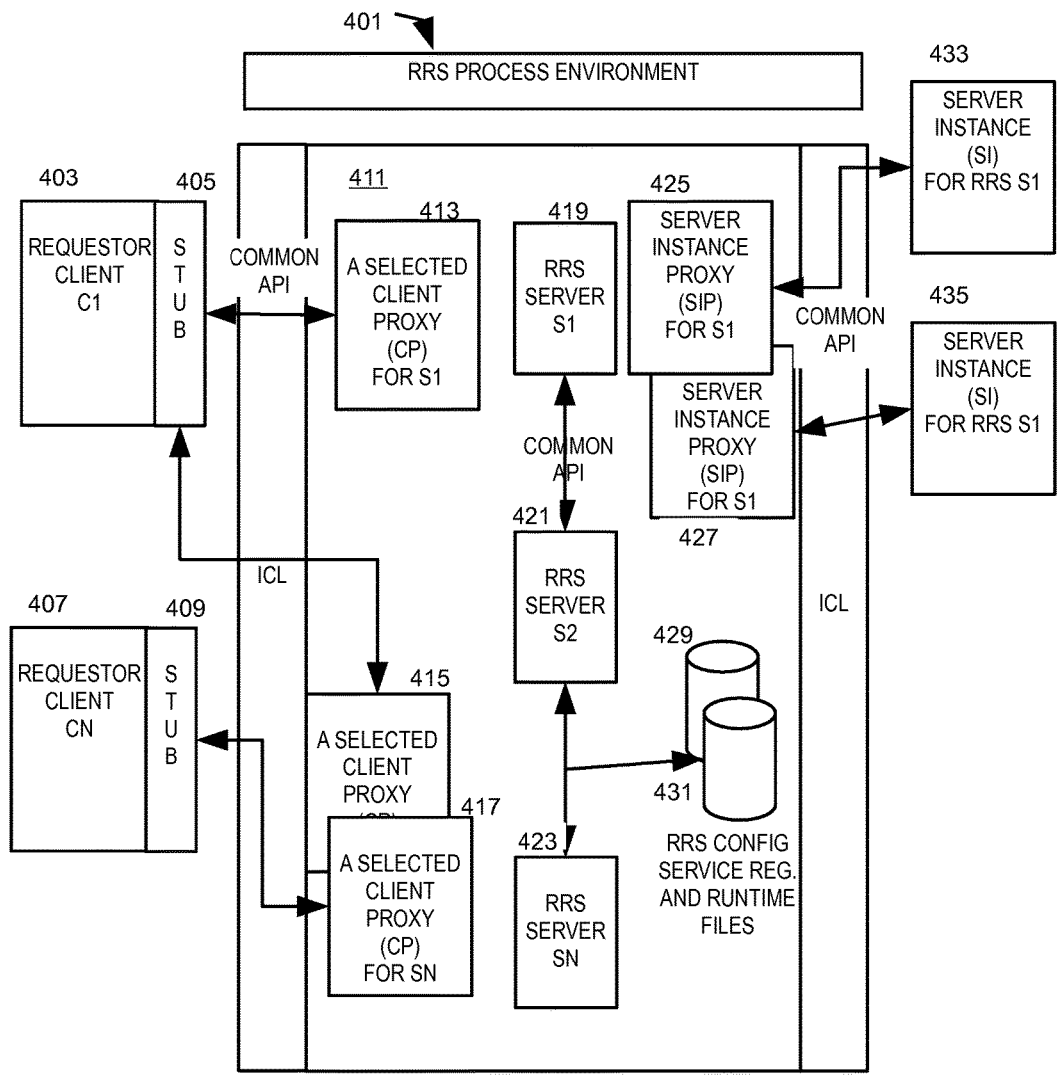
FIG. 4 is a block diagram illustrating architecture of a request-reply service (RRS) process environment.

FIG. 4 illustrates an overall simplified view of the RRS mechanism, specifically, an architecture for an RRS process environment 401. In FIG. 4, there are illustrated a requestor/client C1 403 and a requestor/client CN 407, representative of any number of requestor/clients (sometimes referred to simply as a "requestor" or "client", terms which are understood in the art); the RRS process environment 411; and server instances for RRS S1 433, 435, which are representative of any number of server instances for server S1, and for other servers S2 . . . Sn (not illustrated).

The RRS process environment 401 includes a selected client proxy (CP) which is specific to a pair consisting of the one requestor client and the requested service (or more particularly to the RRS server for the requested service). In this example, there are selected client proxies (CP) for C1-S1 413, for C1-Sn 415, and for Cn-Sn 417. There is also a server instance proxy (SIP) 425, 427 corresponding to each server instance 433, 435. There is also a different RRS server dedicated to represent a different unique service and to provide connections from a client to a server instance which corresponds to the different unique server; here there are different RRS servers S1, S2 . . . Sn 419, 421, 423, representative of any number of RRS servers. It should be noted that the number of RRS servers in a particular process environment will change as different unique services are requested and then no longer needed, the number of client proxies in the particular process environment will change in response to each pairing of a client that needs or releases a selected client proxy and a different unique service that the client requests to communicate with; and the number of server instance proxies in the particular process environment will change as the number of available servers and server instances are made available or released.

Also illustrated in FIG. 4 is a storage 429, 431 which is part of the RRS process environment 401, which provides RRS configuration, service registration and/or runtime files. This storage 429, 431 also stores an RRS ontology, which has a separate individual RRS ontology for each of the unique services. The individual RRS ontology provides a syntactical and semantical framework to establish processing when the RRS for the unique service is instantiated with reference to the individual RRS ontology for the unique service; the processing and the RRS which is instantiated based on the individual RRS ontology is dedicated to represent the unique service.

It should be noted that there is a common API between the requestor/client and the RRS, of which there is one instance of a dedicated RRS (regardless of the servers to which the RRS is providing the connection). This is mirrored on the connection between the server instance (S1) (of which there can also be multiple instances for a particular service) and also mirrored between any communication between RRS instances whether they be for different service connections or identical ones. In the RRS process environment 401, there can be provided only one common API, and consequently in communicating between the different components there is only one interface. Accordingly, the common API provides for (i) mutual communication between a plurality of clients and the plurality of different RRSs, (ii) mutual communication between the plurality of different RRSs, and (iii) mutual communication between the plurality of different RRSs and a plurality of server instances. A preferred embodiment of this interface can conveniently use XML objects.

One of the advantages of the system/mechanism discussed herein is that the complex logic that usually has to be coded in the requestor/client (and provider/server Instances) according to known techniques, can be substantially reduced and the maintenance required for changes also reduced.

In addition, FIG. 4 illustrates an Independent Communication Layer (ICL) included in the RRS process environment 401. The ICL can be provided to deal with the different transport protocols that exist between different platforms in a distributed environment and is known to those skilled in the art. No further detailed explanation of the ICL is needed for those skilled in the art. Accordingly, the ICL provides management of transparent transport connectivity in the ontology-based request/reply service environment.

A requestor/client C1 . . . Cn 403, 407 may include a stub 405, 409 which deals with the mundane but essential task of an appropriate communication through the ICL to connect to one of the client proxies (CP) 413, 415, 417 in the RRS process environment 401; the one of the client proxies 413, 415, 417 will connect to the one of the requestor/clients 403, 407 and will manage communication with the desired RRS 419, 421, 423 (which is determined by the service requested by the requestor/client). It is important to note that the CP mechanism (i.e. multiple CPs) not only solves the problem of conventional art that the RRS can be blocked by one client but also can provide the feature of persistence of the request/reply during the communication process.

A Server Instance (SI) stub (not illustrated) and Server Instance Proxy (SIP) 425, 427 can accomplish the communications through the ICL to connect to the server instance 433, 435 for the Server instance side, including communications to/from the RRS 419, 421, 423.

The RRS server 419, 421, 423 (here, each dedicated to a different service) each can have one or more server instances 433, 435 (here, RRS server S1 419 has two server instances), which is dedicated to the corresponding different service and contain the same logic—this being configured from the RRS Configuration/Registration file/database 429, 431 and loaded from the RRS runtime. The dedicated logic in the RRS server to deal with the requestor/client request, provider/server instance is configured and consequently is not written separately for each type of service. This can save enormously on many aspects including maintenance and administration, portability and dynamic updating of new server instance versions (for example, allowing existing connections to run to completion while new versions can be introduced seamlessly without reloads, and similar).

Using this RRS process environment 401, there can be provided an extremely efficient communication between requestor/client and provider/server as well as a common API approach regardless of the type of service. The possibility of both multiple RRSs for the same service and multiple managed server instances which can be pre-setup and/or dynamically invoked provide for an efficient load balancing.

In addition, while this is an example embodiment, the RRS process environment may be scalable with the addition of a clustered environment for the RRS 419, 421, 423 instances and server instances 433, 435.

Figure 5:
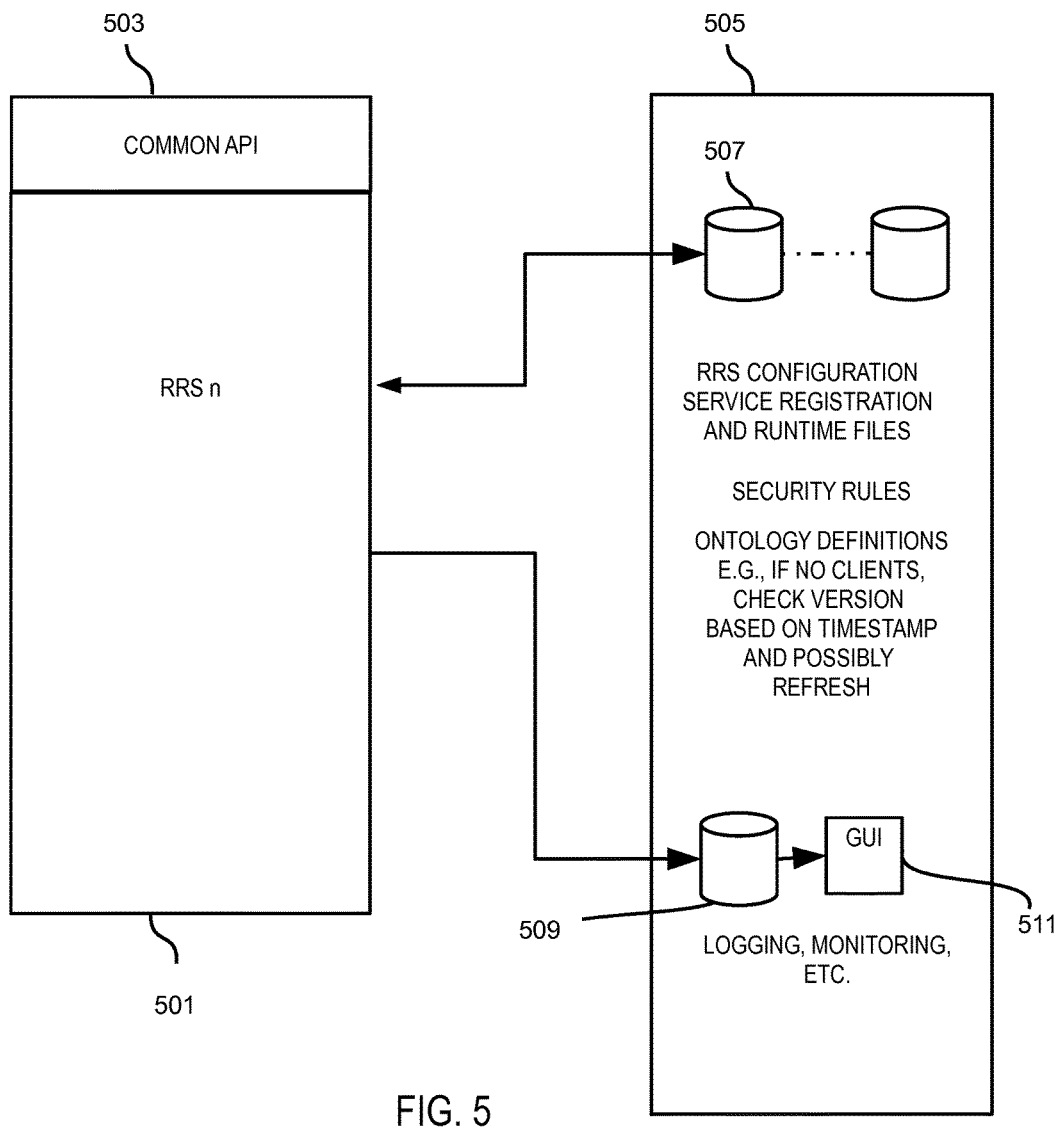
FIG. 5 is a block diagram illustrating inputs to the RRS.

FIG. 5 is a block diagram illustrating inputs to the RRS. In FIG. 4, an RRS n 501 includes a common API 503. The RRS communicates with storage 505 which can include one or more files 507 for RRS configuration, service registration, runtime files, security rules, and ontology definitions; one or more files 509 for logging, monitoring and the like; and a GUI 511 for providing functions such as administration/maintenance, reviewing and/or editing the files 507, 509, and the like.

The Admin/Maintenance function can be achieved in any of the conventional ways (for example, Admin GUI, parameter files and the like) as well as by the dynamic results of the behavior of the RRS themselves.

Basically, the RRS configuration service registration and runtime files 507 (referred to as "configuration file" or "configuration rules") determine how the RRS logic will run. In the simple case it determines how the RRS communicates to and from the provider/server instance and the requestor/client to achieve the desired responses to the requests. Should the request involve work from multiple RRSs, then the primary RRS will be configured to call any necessary other RRS(s) and the appropriate logic is loaded and configured from the RRS at runtime. At all times there can be one common API in use (and in a preferred embodiment this can be XML-based). The storage can include an RRS ontology which includes ontology definitions, for example (but without limitation), if there are no clients, check the version based on the timestamp and possibly refresh.

One can see also from FIG. 5 that the security mechanism can be enforced by the RRS according to the security rules. This can allow for a wide variety of security mechanisms to be applied and more than one mechanism simultaneously if required by the nature of the services.

Naturally, logging and monitoring 509 according to known techniques in various shapes and forms can be provided.

By use of the RRS configuration, service registration, runtime files, security rules, and particularly the RRS ontology, dynamic changes can be made to how the system performs in real-time.

The configuration rules determine how communication and flow are achieved at a desired or an optimal level between requests and responses. The RRS ontology determines the behavior of the RRS both individually and collectively. While at a simplistic level one could characterize the configuration rules as just another set of rules, nevertheless the system with such RRSs can react to patterns of behavior that can be dynamically modified either by the administrator or the RRS themselves.

Example for Ontology to Detect a Pattern:

The following are sample SWRL specifications for detecting the Composite design pattern:

. . .

Identifying the Composite Pattern:
composite: hasLComponent (? leaf, ? component)∧
composite: hasContainer (? composite, ? container)∧
composite: hasComponent (? composite, ? component)∧
composite: hasCompositeClass (? container, ? composite)∧
composite: hasComponentClass (? container, ? component)∧
composite: hasLeafClass (? container, ? leaf)

For example, if multiple RRSs detect an abnormal increase in the number of security violations then this pattern could result in, for example, the change in access to some identified sensitive services.

V. Detailed Description of Components and Flow

The overall design disclosed herein can allow a messaging server to process client requests via multiple Request/Reply Service (RRS) instances, which can be created dynamically.

Referring back to FIG. 4, a single client 403 can send requests to multiple server instances 433, but a server instance 433, 435 is bound to a single RRS 419 such that the server instance(s) and RRS are dedicated to the same unique service. However, a single client 403 process can have multiple server instances which each are connected to respective different RRSs, but the server instance and RRS are dedicated to the same unique service.

A. Request/Reply Service (RRS)

A RRS can be viewed as, in part, a messaging construct that encapsulates the concept of a service. It contains the definitions of the delivery and management of requests and replies within the unique service. It is this facility—the RRS server—that contains the security controls that control, for example, which clients can connect and send requests, if all requests/reply pairs be archived, or if only failed requests be archived for use by external systems for data recording and compliance.

B. Conversation Styles

An RRS can maintain a list of its currently registered workers (server instance proxies, server instances) and can pass requests from clients to the workers for processing of the client requests. This passing of requests can be configured in multiple different ways:

1. Bonded: Where the client is bound to the server instance (SI) for the duration of the client connection. This coupling can endure across disconnections and reconnections, thereby allowing the client and SI to continue their conversation.

2. Un-Bonded: Where the client request can be sent to another server instance, for example, the next least busy SI. Useful where the request/reply is stateless between previous requests.

3. Multiple Delivery: Allows a single request to be sent to multiple SIs. For multiple delivery, the RRS will send only the first response to the request to the client; the RRS will drop all other replies resulting from the same single request. This is intended to support the fastest response to the single request.

4. Parallel Delivery: Allows a client to send a group of requests as one message to the RRS that will then send individual requests to different SIs, thereby allowing parallel processing of different requests. Useful if each request is not dependent on the previous request.

5. Round Robin: Where each request received will be passed to the next SI in the list, thereby providing a simple Load Balancing mechanism.

C. Server Instances (SI)

An SI can register with a RRS and indicate that it is ready to receive requests from a specific RRS. The registration will include details, by way of example:

1. Delivery Mode: If the Requests are to be delivered asynchronously to the SI or if the SI will request them from the server.

2. Request Limit: Number of outstanding Requests that the SI has yet to respond to before the RRS stops sending more Requests.

3. Rollback strategy: If the SI disconnects from the RRS then this defines what should the RRS do with the requests that this SI has yet to complete. This can include, for example, re-directing delivery to another SI, or providing a failure notification to the requestor/client.

4. Archive: The SI can also indicate in the response if the RRS should in fact archive this response or not.

When a request is received by the SI from the RRS, the SI can process the request and then send a suitable reply to the requestor/client. The SI can request the RRS to send an acknowledgement to the SI when the requestor/client receives the response. The Archive functionality can also indicate to the server whether the request—reply combination is to be archived by the RRS, if the RRS is suitably configured to support this.

D. Requestor/Client

A requestor/client can find the relevant RRS to which they wish to send requests by using a simple API call, for example, known techniques such as the find(servicename) API call. The requestor/client is returned from the call an RRS object, after which the client is then free to send requests and expect replies using a range of simple APIs as part of the common API.

For each request or block of requests, the client can either wait synchronously for the response or, for example, supply an asynchronous callback function to handle the responses as they arrive.

The API can allow a block of requests to be sent to the RRS. For each request block sent, the requestor/client can indicate if the requests are atomic and as such cannot be split across several workers or if the requests are independent of each other such that the RRS can allow them to be processed in parallel across multiple SIs.

A request can contain attributes that can be part of the request; these include by way of example, but are not limited to:

1. Acknowledgment Notification: This is where an event would be sent to the requestor/client when the RRS acknowledges receipt of the request, and/or when the SI acknowledges receipt of the request. This can require additional bandwidth and processing to perform.

2. No Reply Required: If the requestor/client does not need a reply from the RRS or SI, for example, this is just a one-way Request.

3. Response Handler: If the requestor/client wishes to processes the request asynchronously then they can supply a response handler callback reference. All event notifications for the specific request will be delivered to the response handler.

4. Termination: The client can send this to the SI indicating that all requests have now been completed and any state being held can be flushed.

E. ICL & Multi Channel System Access

The mechanism/system can uniquely provide access to the RRS using APIs in a range of computer languages, which can span, for example, enterprise, web and mobile contexts. These in turn can instantiate sessions over a variety of transport protocols including one or more of Sockets, SSL, HTTP, HTTPS, WebSocket Shared Memory, Remote Direct Memory Access (RDMA), and the like. This multi-language and multi-protocol approach is possible because the ICL layer separates and abstracts operations to transport data (communications drivers) from user level operations on the data (Request/Reply API).

F. Ontology Based Request/Reply Services

1. Ontology Definition

An RRS server, when starting up, is instantiated using its own ontology definition from a configuration file in the system. An ontology definition file can capture the following which are provided by way of example (though it is not limited to just these):

1. Type of the RRS
2. API signatures
3. Rules/Policies

For instance, the ontology definition file of a flight booking RRS can be rendered along the following lines:

<Ontology>
<Type> Flight-Booking RRS </Type>
<API signature> bool seat_available(flight number, class) </API signature>
<API signature> bool book_seat(flight number, class) </API signature>
<API signature> list list_flights(range of time) </API signature>

<ACL> . . . </ACL>
<Throttling parameters> . . . </Throttling parameters>
</Ontology>

In a scenario where one RRS is called by a client to provide multiple services (and thus is viewed by the client that a single RRS provides plural services), the RRS can offload its corresponding server instance by making internal API calls to its subordinate and yet independent RRSs for each of the different services which the RRS uses to provide the reply (replies) to the client. Consider a travel agency service, which is a conglomerate of flight booking, hotel booking and car booking services.

Figure 6:
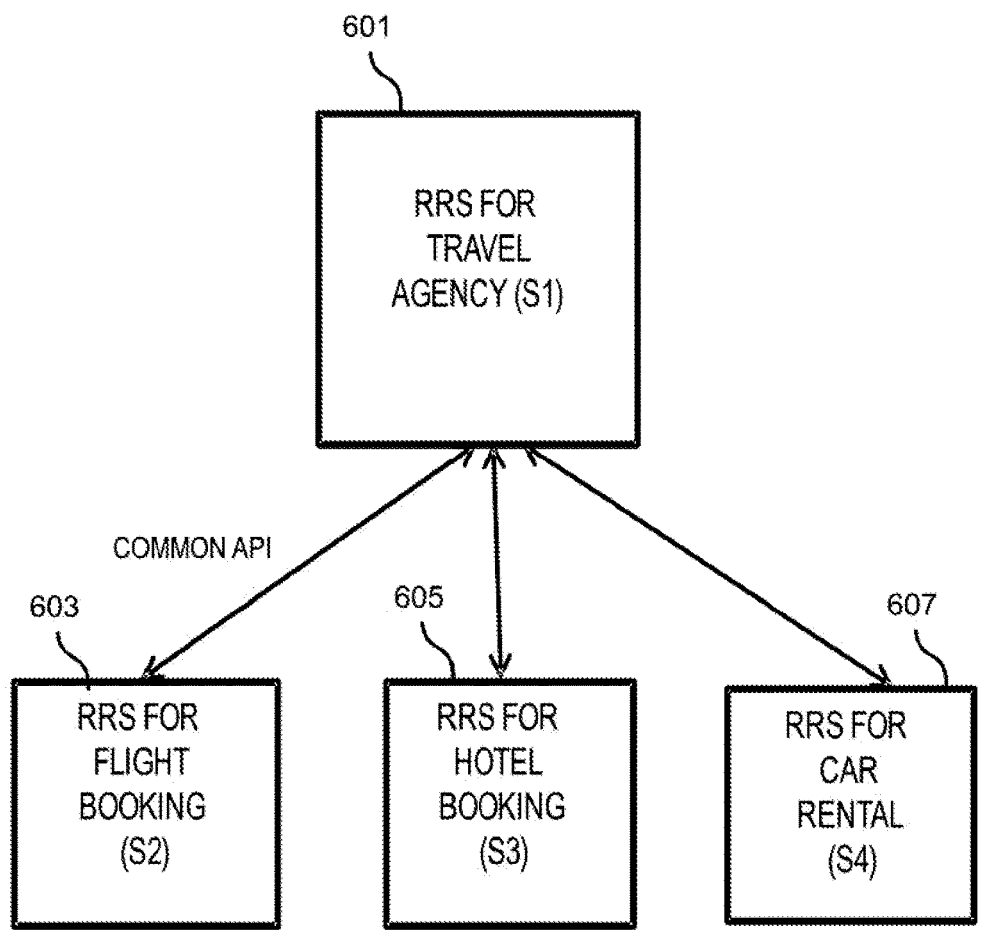
FIG. 6 is a block diagram illustrating a concrete example of RRS making internal calls to subordinate/separate RRS's.

FIG. 6, for example, provides a concrete example of an RRS making internal calls to subordinate/separate RRSs. FIG. shows a primary RRS for a travel agency (S1) 601, and subordinate RRSs represented by an RRS for flight booking (S2) 603, an RRS for hotel booking (S3) 605, and an RRS for car rental (S4) 607.

In FIG. 6, the primary RRS for Travel Agency (S1) 601 makes calls into the RRS for Flight Booking (S2) 603, the RRS for Hotel Booking (S3) 605 and the RRS for Car Rental (S4) 607, to complete a travel request for a certain time period, requested by a client. By having the logic of calling into the subordinate RRS's built into the primary RRS for Travel Agency, the mechanism:

Significantly reduces the number of round trips between the server instances and the RRSs.

Significantly reduces the logic to be implemented in the server instances.

Note that the APIs used to call into the subordinate RRS's can be the same as the ones called by the client requests, despite the fact that the calls are made by the primary RRS for Travel Agency, as illustrated in FIG. 6. Further note that the primary RRS does not need to communicate with its subordinate RRSs via the ICL, and therefore the primary RRS itself does not need its own client proxy.

The ontology definition for the Travel Agency RRS can be rendered as:

<Ontology>
<Type> Travel Agency RRS </Type>
<API chain>
<API signature> bool list_available_during(in_param range_of_time, out_param list_of_available_flights, out_param list_of_available_hotel_rooms, out_param list_of_available_cars)</API signature>
<Logic Bytecode>/* location of logic bytecode which dispatches the calls */ </Logic Bytecode>
<sub RRS><Type> Flight Booking RRS </Type>
<Ontology location>"c:/ontology_def/Flight_Booking_RRS_ONTO.def"/* with this ontology file, the RRS runtime can generate corresponding stubs */</Ontology Location>
. . .
</API chain>
<ACL> . . . </ACL>
<Throttling parameters> . . . </Throttling parameters>
</Ontology>

For calling into the subordinate RRSs, the primary RRS needs to know how to plug in the parameters from the received calls and how to generate the calling stubs. Therefore in the Ontology definition file for the primary RRS, the location of the bytecode that instructs on how to marshal and de-marshal the parameters can be indicated, as well as the location of the Ontology definition files specific to each of the subordinate RRS(s).

VI. Implementation

The following two use-cases, of multiple delivery, and of multi-service request, are well suited to demonstrate various implementation details.

A. Multiple Delivery

The multiple delivery problem is a typical scenario derived from a Publish and Subscribe messaging pattern. In the multiple delivery problem, the same request (message) is sent to many servers/subscribers. But if the benefits of the request reply pattern are in the foreground of the architecture, this can only be implemented in a cost-inefficient way. This is because the same request (message) has to be sent manually to multiple servers and on return, the client application has to decide, which response to accept. But in addition to this decision, all of the other active connections have to be dropped and/or closed appropriately.

Using additional rules/an ontology inside an RRS will enable a multiple delivery problem to be handled and resolved transparently to the client. The client's calling sequence is not affected, only the configuration to activate the Multiple Delivery mechanism.

Multiple delivery is discussed in connection with FIG. 7, which illustrates the RRS process environment in a multi-delivery scenario, and FIG. 8 which is a flow chart of a process for multi-delivery using the RRS process environment. These figures are now discussed.

Figure 7:
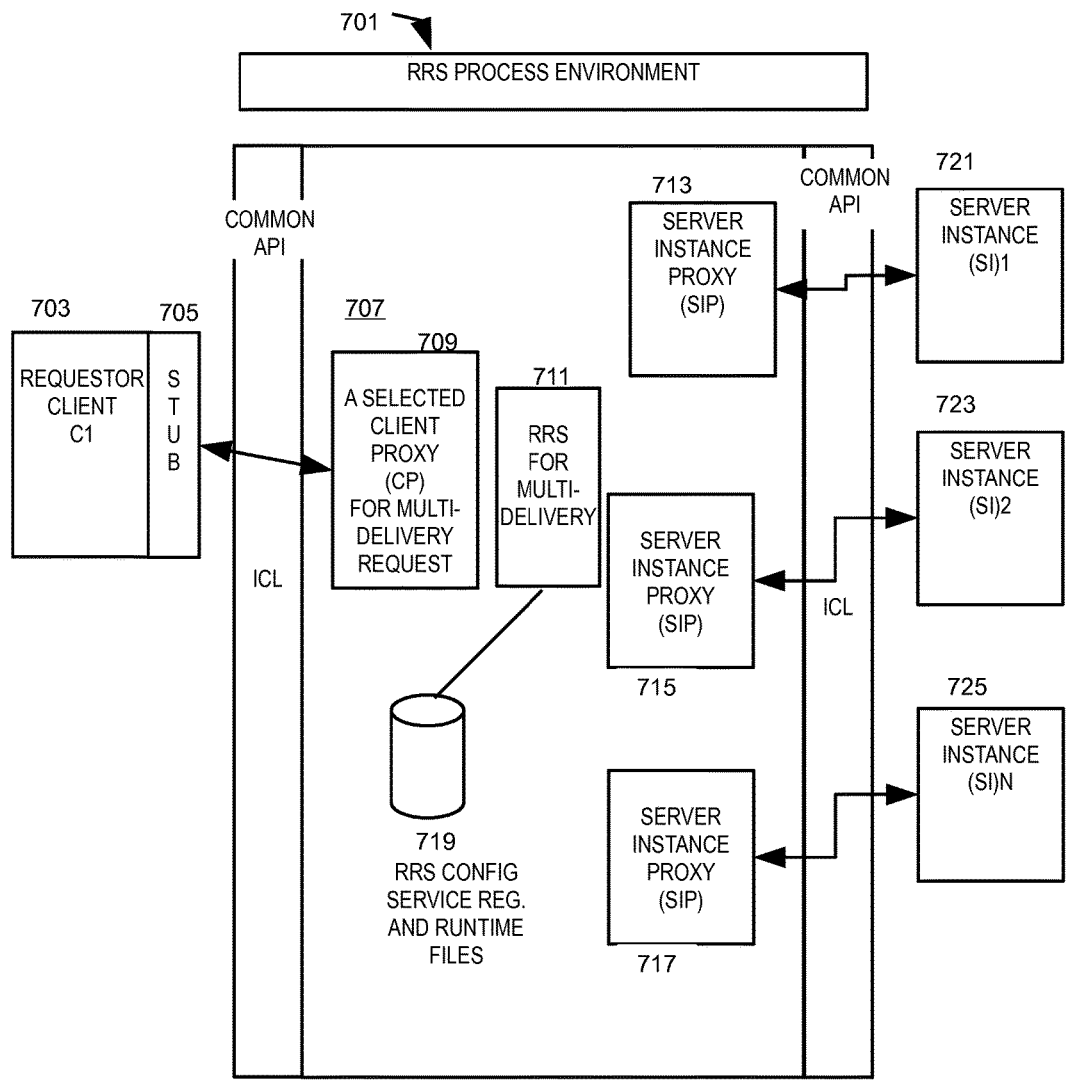
FIG. 7 is a block diagram illustrating architecture of the RRS process environment in a multi-delivery scenario.

FIG. 7 illustrates the communication between the client with multiple server instances through one instance of an RRS which is responsible for all the connection and delivery details. In overview, there are illustrated a requestor/client C1 703 which includes a client stub 705; the RRS process environment 701; and server instances 721, 723, 725 SI1 . . . n for the multi-delivery RRS 711, which are representative of any number of server instances for RRS for multi-delivery. The RRS process environment 701 includes a selected client proxy (CP) 709 which is specific to a pair consisting of the one requestor client C1 and the requested multi-delivery service RRS. There is also a server instance proxy (SIP) 713, 715, 717 corresponding to each server instance 721, 723, 725. Also illustrated in FIG. 7 is a storage 719 which is part of the RRS process environment 701, which provides RRS configuration, service registration and/or runtime files, and also an RRS ontology, which provides a syntactical and semantical framework for at least the RRS for multi-delivery and any other different RRSs which can be supported by the RRS process environment 701.

In more detail, the configuration for a certain request (type) can cause the Multiple Delivery mechanism to be activated inside an RRS which is instantiated with that configuration. When the call arrives from the client 703 side, the RRS 711 can spawn requests, e.g., up to a predefined number of identical requests, to any number of server instances 721, 723, 725 (limited by practical considerations) all corresponding to the same unique service. When the replies to these requests arrive back at the RRS 711, ontology rules can decide which replie(s) to accept and to forward to the client 703, and which replies to silently refuse or even to send a disconnect message, for example in a situation in which the request was not dealt with by an elapsed time. In any case, the additional server connections can be handled merely by the RRS 711 without involving any client side action.

Figure 8:
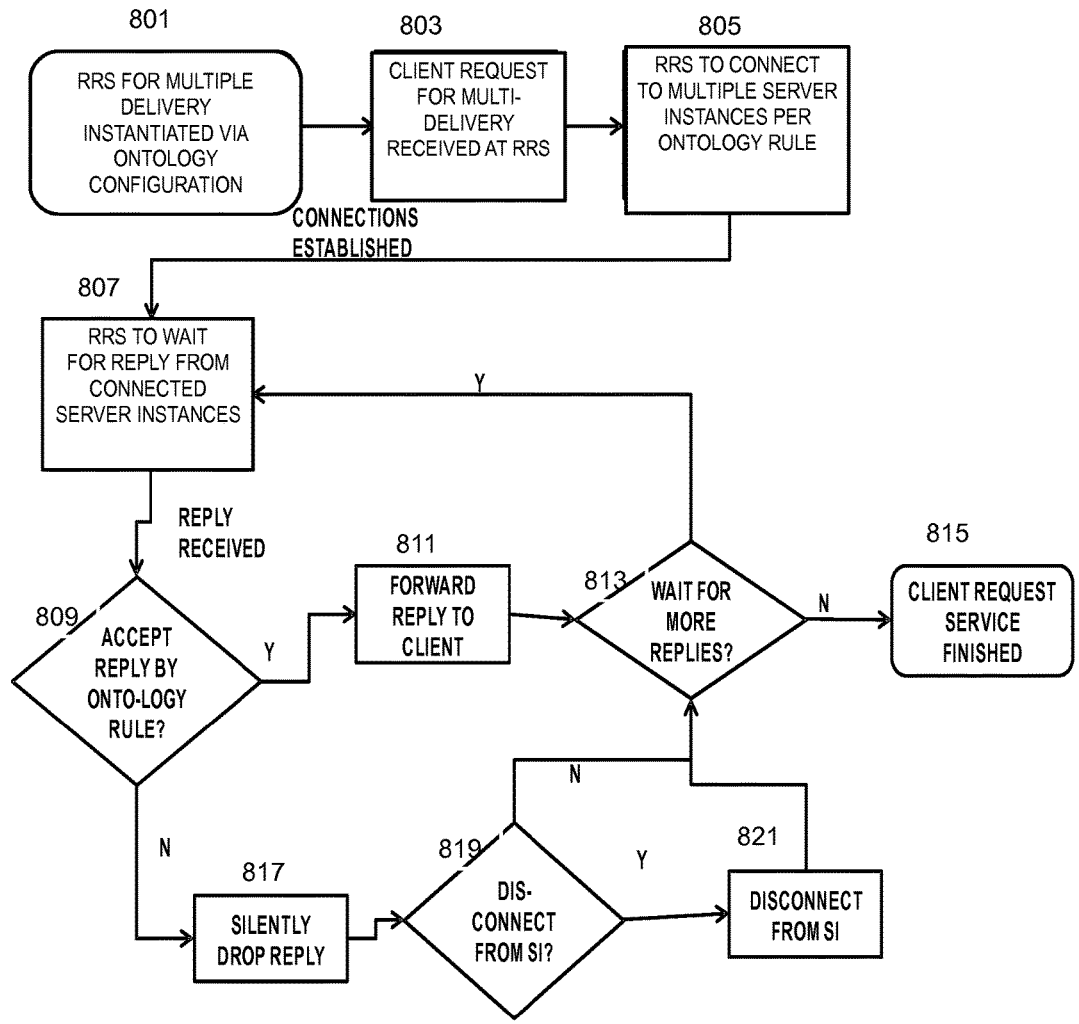
FIG. 8 is a flow chart of a process for multi-delivery using the RRS process environment.

FIG. 8 illustrates a flow chart of a process for multi-delivery in the context of a RRS. Upon receiving a call which indicates an RRS service for multiple delivery, such RRS for the multiple delivery is instantiated using at least the ontology configuration, as discussed elsewhere. Then, the client request for the multi-delivery is received 803 at the RRS which was instantiated. The RRS then connects 805 to each of the multiple server instances and sends the request to each of the multiple server instances, as indicated per the ontology configuration. The RRS then waits 807 for a reply from the multiple server instances to which it is connected. When a reply is received, the RRS will determine 809 whether to accept the reply, in accordance with the ontology configuration. If the determination is to accept the reply, the RRS will forward 811 the reply to the client. If the determination is not to accept the reply, the RRS will silently drop 817 the reply, determine 819 whether to disconnect from the corresponding server instance and if so then disconnect 821 from the server instances. Then, after the reply is forwarded to the client or dropped while the server instance remains connected, the RRS will determine 813 whether to wait for more replies. If the determination is to wait for more replies, the RRS will loop to wait 807 for another reply from the connected server instances. If the determination is not to wait for more replies, the RRS will consider that the client request service 815 is finished.

B. Multi-Service Request

This more complex scenario involves inter-RRS communication as outlined before. A typical use-case consists of a major service, which itself requires the assistance of other (subordinate, but independent) services.

In the case of a travel agent service, the query for a particular journey including flight and hotel reservation and car hiring obviously requires up-to-date information on the availability of (a specific/multiple) flight(s), hotel(s) and car(s).

Using the common approach in a request-reply pattern system, the superior "travel agency" service can act as a client and in turn query a "flight booking" service, a "hotel booking" service and a "car rental" service with information gathered directly from the client request.

Herein, the logic to query the subordinate RRS's lies within the RRS for Travel Agency, alleviating the burden for the requestor client and the server instance for RRS for Travel Agency significantly.

Figure 9:
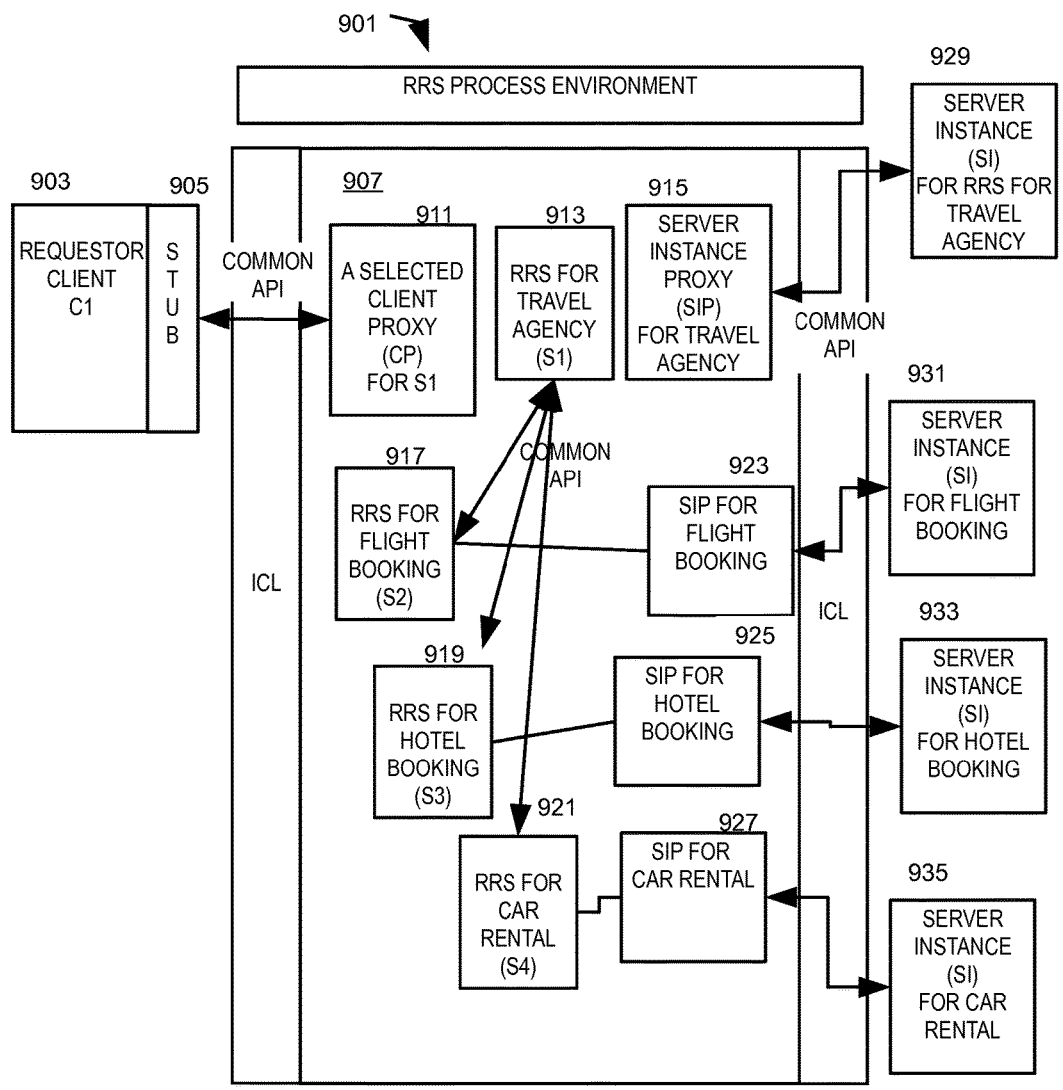
FIG. 9 is a block diagram illustrating a concrete example of the RRS process environment in a multi-service scenario.
Figure 10:
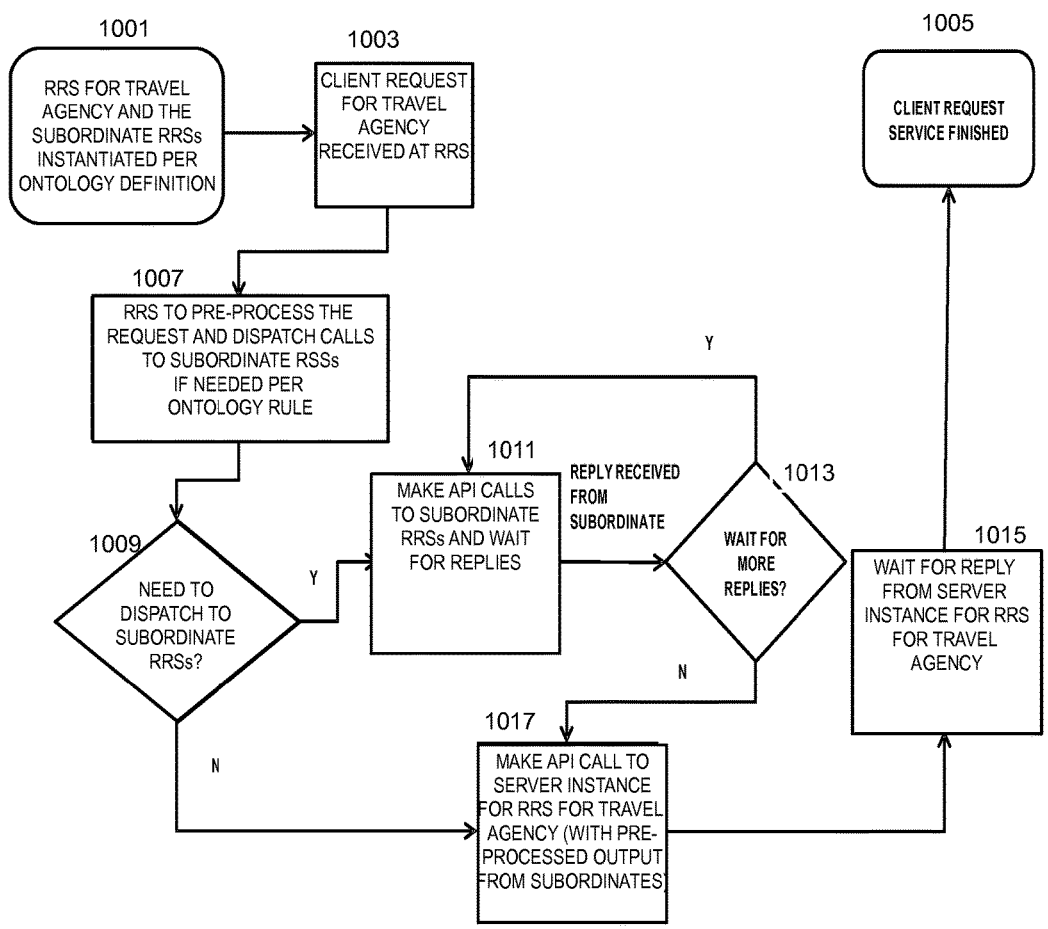
FIG. 10 is a flow chart of a concrete example process for multi-service using the RRS process environment.

The multiple service request scenario is discussed in connection with FIG. 9, which illustrates the RRS process environment in a multi-service scenario, and FIG. 10 which is a flow chart of a concrete example for multi-service using the RRS process environment. It may be noted that the multi-service and multi-delivery features may be incorporated into one RRS, if desired. FIG. 9 and FIG. 10 are now discussed.

FIG. 9 illustrates communication between the client through one instance of a primary RRS which is responsible for all the connection and delivery details of multiple service requests that the request from the client triggers via the primary RRS 913 for the travel agency. In overview, there are illustrated a requestor/client C1 903 which includes a client stub 905; the RRS process environment 901; primary RRS 913 for the travel agency, subordinate RRSs 917, 919, 921 each dedicated to, respectively, the flight booking service, the hotel booking service, and the car rental service; server instances 929, 931, 933, 935 each dedicated to, respectively, the travel agency service, the flight booking service, the hotel booking service, and the car rental service. The RRS process environment 901 includes a selected client proxy (CP) 911 which is specific to a pair consisting of the one requestor client C1 and the requested multi-service RRS 913. There is also a server instance proxy (SIP) 915, 923, 925, 927 corresponding to each server instance 929, 931, 933, 935. Also included in the RRS process environment 901 is a storage (not illustrated) which provides, among other things, an RRS ontology, which provides the syntactical and semantical framework for at least the primary RRS (which is multi-service), the subordinate RRSs called by the primary RRS, and any other different RRSs which can be supported by the RRS process environment 901. The portion of the RRS process environment 901 which excludes the ICL is referred to herein as the "internal RRS process environment" 907; calls between entities which are all within the internal RRS process environment are referred to herein as "internal calls." Internal calls may utilize the common API, but do not use the ICL.

The intelligent "travel agency" RRS 913 can make use of an ontology (not illustrated in FIG. 9) to automatically query the "flight booking," "hotel booking" and "car rental" RRSs 917, 919, 921 via the internal API and to query for appropriate hotel and car information before sending the client request to the instance 915 of a "travel agency" server. The request message to subsequent subordinate RRSs can be enhanced and/or supplemented with information gathered from the internal request(s) to the "hotel booking" and "car rental" RRSs. This way, the "travel agency" server would already have information ready to formulate a complete reply (such as a complete booking offer) to be sent back to the original client C1 903.

FIG. 10 illustrates a flow chart of a process for multi-service in the context of a RRS. Upon receiving a call which indicates an RRS service which itself relies on multiple services, such multi-service RRS is instantiated 1001 using at least the ontology configuration, and the subordinate RRSs indicated in the ontology configuration for the primary RRS are also instantiated per their respective individual ontologies, as discussed elsewhere. Then, the client request for the multi-delivery is received 1003 at the primary RRS which was instantiated. The primary RRS then pre-processes 1007 the request and dispatches calls to each of the subordinate RRSs as required per ontology rule(s) for the primary RRS. The RRS then determines 1009 whether there is a need to dispatch to subordinate RRSs. When it is determined that there is a need to dispatch to subordinate RRSs, the RRS will make calls 1011 to each of the subordinate RRSs and wait for their replies. When a reply is received from one of the subordinates, the RRS determines 1013 whether to wait for more replies, and if so loops to make calls 1011 and wait for more replies. If it is determined to not wait for more replies, or if it is determined that there is no need to dispatch to subordinate RRSs, then the RRS will make an API call 1017 to a server instance for the RRS for the travel agency (with pre-processed output provided from the subordinate RRSs). Then, the RRS will wait 1015 for a reply from the server instance from the RRS for the travel agency. Finally, the RRS will send a reply to the client and will consider that the client request service 1005 is finished.

C. Common API

Communication with the RRS can be classified into two categories:

1. Horizontal Communication:

Horizontal communication represents the communication between the Client/Requestor and one RRS, and the communication between one RRS and the server instance.

2. Vertical Communication:

Vertical communication represents the communication between two (or more) RRSs. In the case of the Travel Agency, vertical communication is between the primary RRS for Travel Agency and a subordinate RRS.

The characterization of the communication as vertical or horizontal is on the viewpoint of the RRS(s) in the communication. If two or more RRSs are involved, the communication is vertical.

Typically, there can be provided a set of APIs for horizontal communication and another set of APIs for vertical communication. Both horizontal and vertical communication can leverage the same set of APIs if appropriate. In case of the Travel Agency scenario, the APIs can be the same across horizontal and vertical.

D. Sequence of Request/Reply Routing

Figure 11:
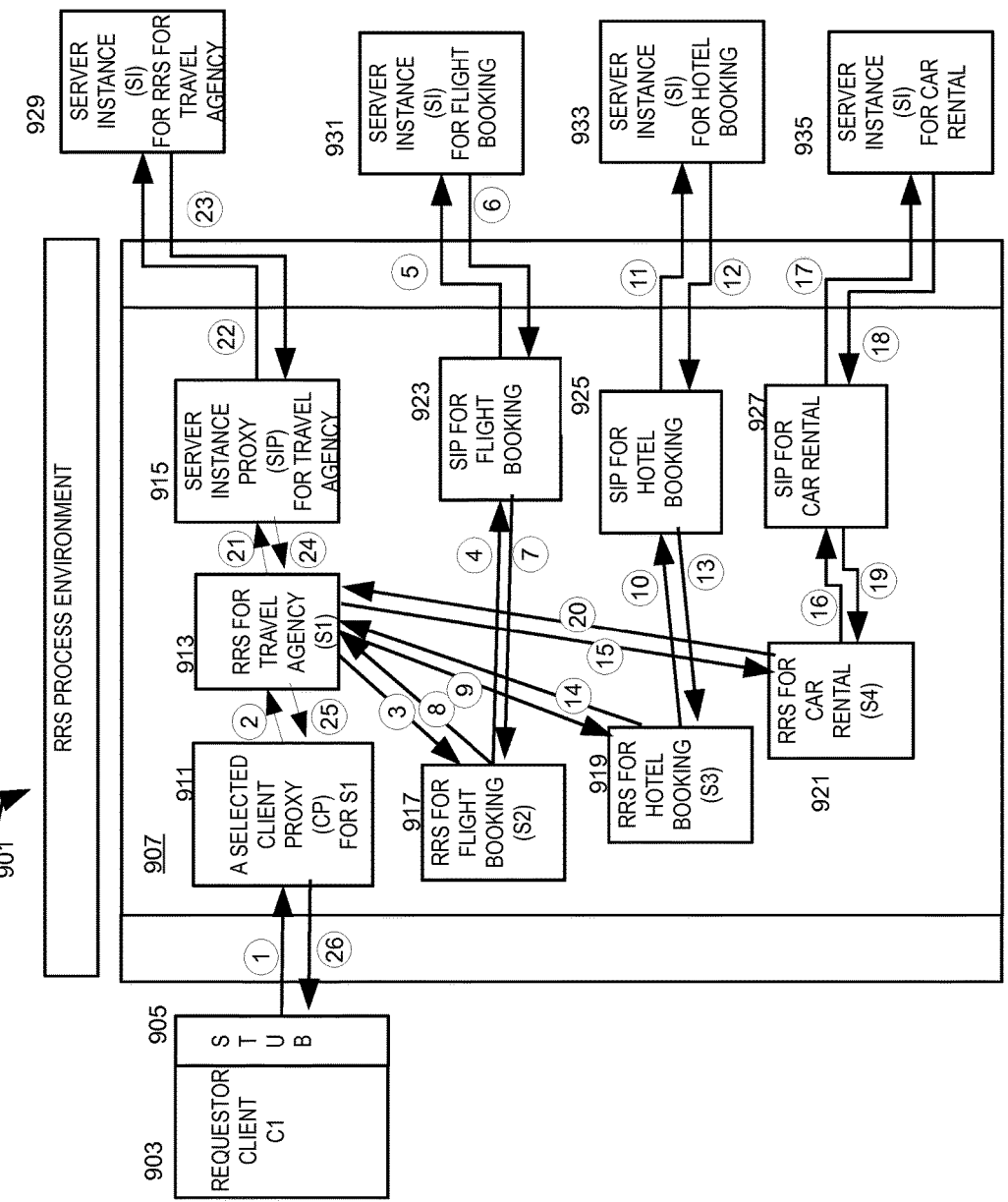
FIG. 11 is a sequence diagram based on the block diagram of FIG. 9.

FIG. 11 illustrates a sequence of request/reply routings, using the example of the multi-service scenario discussed in connection with FIG. 9. In FIG. 11, each of the references elements in the form of 9xx is identical to those discussed in FIG. 9. FIG. 11 adds additional information regarding the sequence, which was omitted from FIG. 9 for simplicity, but with the foregoing background can now be discussed. The following routing sequences occur in series:

(1) The requestor/client C1 901 communicates to the RRS process environment (through the ICL) a request that indicates a different unique service S1, in this case, a request for the travel agency service S1. The request for service S1 is received and determined to be directed to the unique service S1. The request is routed to the selected client proxy 911 (CP) which is specific to the combination of the client C1 and the service S1. This request from the requestor client C1 903 appears, to the client, to consist of a single request, to which the client C1 903 likely expects a single reply.

(2) In the situation that an RRS for the travel agency service S1 is not available, the selected client proxy for S1 911 instantiates an RRS 913 for the travel agency service S1, according to an individual RRS ontology specific to the travel agency service (in which all of the individual RRS ontologies for the different unique services are stored in the overall RRS ontology). The individual RRS ontology provides a syntactical and semantical framework to establish the processing (in the instantiated RRS) which is dedicated to represent the unique service. It can be determined whether or not the necessary RRS for the different unique service is already instantiated and is available for communications with client C1. The request from the selected client proxy 911 is routed to the RRS (now instantiated) which is dedicated to represent the travel agency S1 913. In this example, the RRS is one instance of a primary multi-service RRS which is responsible for all the connection and delivery details of multiple service requests that the request from the client triggers via the primary RRS 913 for the travel agency. The multi-service RRS will, among other things, communicate with subordinate RRSs, here, the RRS 917 for flight booking (S2), the RRS 919 for hotel booking (S3), and the RRS 921 for car rental (S4).

(3) The multi-service RRS 913 is configured by the ontology to send a flight booking request to the RRS 917 for flight booking (S2). Note that the RRS 913 can communicate requests and replies to/from its subordinate RRS 917 without going through the ICL; furthermore, even though the flight booking request from the primary RRS 913 appears to the subordinate RRS 917 to be a "client" request, the RRSs 913, 917 do not need a client proxy to facilitate the communications therebetween.

(4) The RRS for flight booking 917 routes the flight booking request to the SIP for flight booking 923.

(5) The SIP for flight booking 923 routes the flight booking request to the server instance for flight booking 931.

The server instance for flight booking 931 operates according to known techniques and performs its usual processing for booking flights.

(6) The server instance for flight booking 931 returns a flight booking reply (based on the results of the unique flight booking processing) to the SIP for flight booking.

(7) The SIP for flight booking 923 routes the flight booking reply to the RRS for flight booking 917.

(8) The RRS for flight booking 917 routes the flight booking reply to the RRS for travel agency 913. The RRS for travel agency 913 might incorporate contents from the flight booking reply into its own reply, and/or into one or more requests to its subordinate RRSs (as previously explained).

(9) The RRS for travel agency 913, which is a multi-service RRS, is configured by the ontology to send a hotel booking request to the RRS 919 for hotel booking (S3).

(10) The RRS for hotel booking 919 receives the request and routes the hotel booking request to the SIP for hotel booking 925.

(11) The SIP for hotel booking 925 routes the hotel booking request to the server instance for hotel booking 933. The server instance for hotel booking 933 operates according to known techniques and performs its usual processing for booking hotels.

(12) The server instance for hotel booking 933 returns a hotel booking reply (based on the results of the unique hotel booking processing) to the SIP for hotel booking 925.

(13) The SIP for hotel booking 925 routes the hotel booking reply to the RRS for hotel booking 919.

(14) The RRS for hotel booking 919 routes the hotel booking reply to the RRS for travel agency 913. The RRS for travel agency 913 might incorporate contents from the hotel booking reply into its own reply to the requestor client C1, and/or into one or more requests to its subordinate RRSs (as previously explained).

(15) The multi-service RRS 913 is configured by the ontology to call the RRS 921 for car rental (S4).

(16) The RRS for car rental 921 routes the car rental request to the SIP for car rental 927.

(17) The SIP for car rental 927 routes the car rental request to the server instance for car rental 935. The server instance for car rental 935 operates according to known techniques and performs its usual processing for car rental.

(18) The server instance for car rental 935 returns a car rental reply (based on the results of the unique car rental processing) to the SIP for car rental 927.

(19) The SIP for car rental 927 routes the car rental reply to the RRS for car rental 921.

(20) The RRS for car rental 921 routes the car rental reply to the RRS for travel agency 913. The RRS for travel agency 913 might incorporate contents from the car rental reply into its own reply to the request client C1 903.

(21) The RRS for travel agency 913 routes the client request (optionally augmented with information from the flight booking reply, the hotel booking reply, and/or the car rental reply) to the SIP for travel agency 915.

(22) The SIP for travel agency 915 routes the client request to the server instance for travel agency 929. The server instance for travel agency 929 operates according to known techniques and performs its usual processing for the travel agency.

(23) The server instance for travel agency 929 returns a travel agent reply (based on the results of the unique travel agency processing) to the SIP for travel agency 915.

(24) The SIP for travel agency 915 routes the travel agent reply to the RRS for travel agency 913. The RRS for travel agency 913 can incorporate information contents from the flight booking reply, the hotel booking reply, and/or the car rental reply, into the travel agency reply.

(25) The RRS for travel agency 913 routes the travel agency reply to the selected client proxy (CP) for S1 911. The selected client proxy (CP) 911 performs client proxy functions according to known techniques to prepare replies to be transmitted to a requestor client, e.g., over a common API, ICL, and via a client stub 905.

(26) The selected client proxy 911 transmits, for example using conventional techniques, the travel agency reply (as prepared by the RRS for travel agency 913) to the requestor client C1 903, for example via the client stub 905.

It will be noted that routing sequences (3), (8), (9), (14), (15) and (20) are all characterized as "vertical" communications, and are all "internal calls" within the "internal RRS process environment" 907. Accordingly, there is no overhead incurred for ICL processing, or for client proxies in these routing sequences. Routing sequences (1)-(2), (21)-(22), (23)-(24), and (25)-(26) are horizontal at the same level as the RRS for travel agency 913. Routing sequences (4)-(5), and (6)-(7) are horizontal at the same level as the RRS for flight booking 917. Routing sequences (10)-(11) and (12)-(13) are horizontal at the same level as the RRS for hotel booking 919. Routing sequences (16)-(17) and (18)-(19) are horizontal at the same level as the RRS for car rental.

Of course, it is possible that one or more of the subordinate RRSs can itself be a multi-delivery RRS and/or a multi-service RRS which calls subordinate RRS(s), and thus the subordinate RRS which is a multi-delivery RRS will be a primary RRS with respect to those subordinate RRSs that it calls. Furthermore, this example has assumed that the multi-RRS simply awaits a reply to each request to the subordinate RRS before processing the next request to a subordinate RRS; however, it is possible for the multi-requests to be submitted to all of the subordinate RRSs without awaiting each reply, and then the replies can be received and handled asynchronously. These and other variations will be appreciated based on the representative examples which are provided.

E. Summary

An ontology-based Request/Reply Service (RRS) can provide a framework for clients and server instances to communicate in a much more efficient manner with most of the logic implemented in the RRS itself. In this framework, there can be provided an Independent Communication Layer (ICL) that facilitates horizontal and vertical communications with the RRSs using the same common API.

Modern applications built on top of this ontology-based RRS framework can perform more correctly and can be more agile for reasons including:

1. RRSs are more intelligent in routing the messages. They can route the messages via vertical communication to other RRSs without having to ask the server instances to make separate calls into the RRSs. This saves round trip time on top of reducing the complexity of the server instances themselves.

2. Each RRS can receive its API definition, security policy and even dynamic-link library/byte code via configuration means (for example, implemented in an XML configuration file). This means that RRS functionalities and policy enforcement logic can vary due to different configurations even though the core implementation of RRSs is the same. This provides a tremendous amount of flexibility to adjust the Service Level Agreement (SLA), security, and the like according to changing business needs.

3. RRSs can be more intelligent in this context of Ontology definition. By being configured based on an ontology specific to each different unique service, an RRS can adopt more logic than just simply passing on the messages, such as discussed above, for example as in the multi-delivery scenario. This allows for more creative code reuse, such as possibly a daisy chain of RRSs to take care of business processes.

VII. Additional Example Implementations

Figure 12:
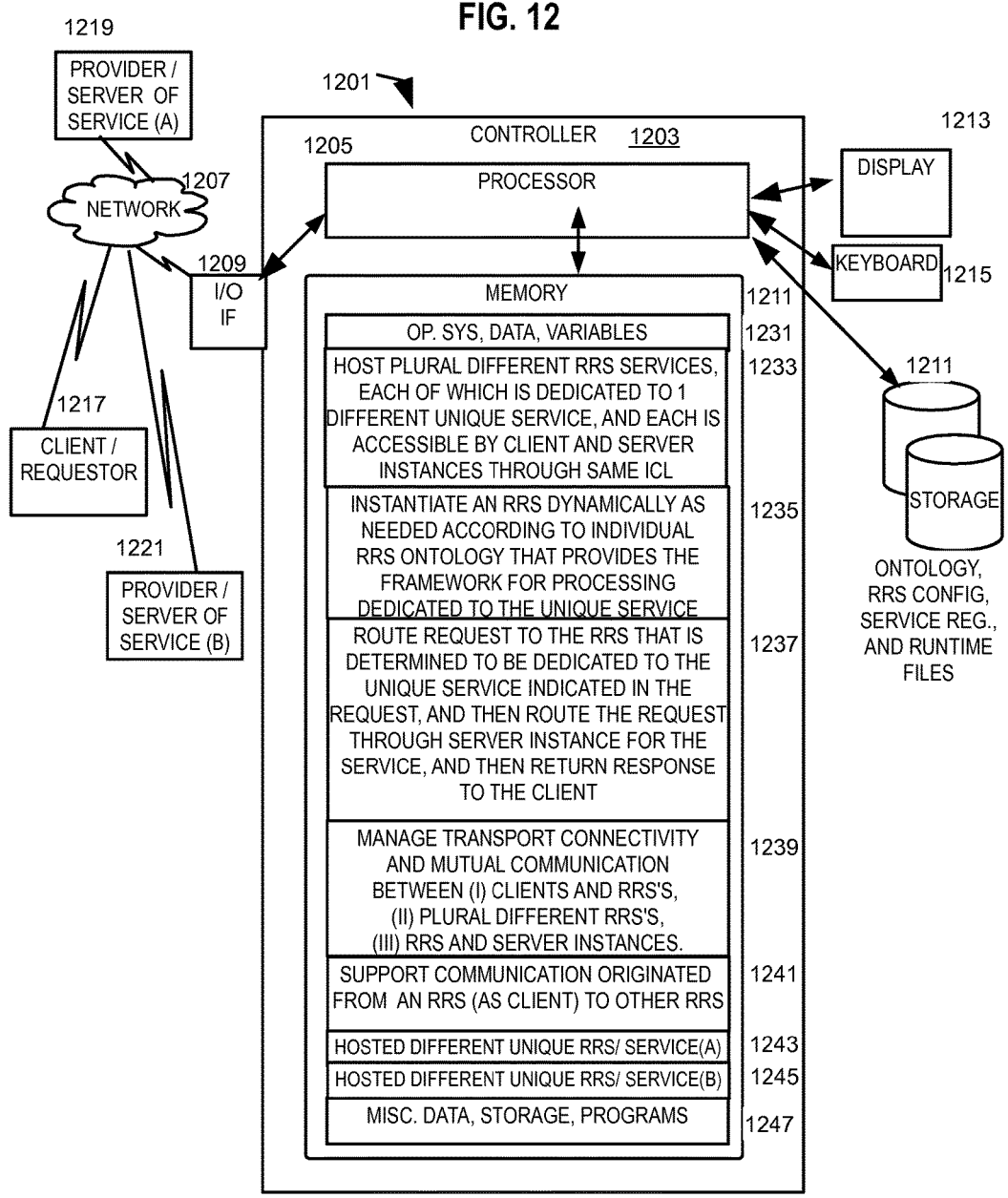
FIG. 12 is a block diagram illustrating portions of a computer supporting the ontology-based RRS.

This section will discuss additional concrete examples of implementation. FIG. 12 illustrates a computer implementation. FIG. 13 illustrates a procedure for an ontology-based request/reply service, which conveniently may be implemented on the computer of FIG. 12, or any another apparatus which is appropriately configured.

Reference is now made to FIG. 12, a block diagram illustrating relevant portions of a computer 1201, on which is provided a computer-implemented environment for an ontology-based request/reply service (RRS). The computer 1201 may include one or more controllers 1203, a processor 1205, an input/output (i/o) interface 1209 for communication such as over a network 1207, a memory 1211, a display 1213 (optional), and/or a user input device (also optional) such as a keyboard 1215. Alternatively, or in addition to the keyboard 1215, a user input device may comprise one or more of various known input devices, such as a keypad, a computer mouse, a touchpad, a touch screen, a trackball, and/or a keyboard. The display 1213 may present information to the user by way of a conventional liquid crystal display (LCD) or other visual display, and/or by way of a conventional audible device (for example, a speaker) for playing out audible messages. Portions of the computer 1201 are well understood to those of skill in this area and have been omitted to avoid obscuring the discussion.

Also, the processor 1205 may be configured to access, using known techniques, a storage (here representing one or more files) which store one or more of an ontology, RRS configuration, service registrations, and/or runtime files. The ontology, RRS configuration, service registrations, and runtime files have been discussed elsewhere herein in more detail.

The processor 1205 may comprise one or more microprocessors and/or one or more digital signal processors. The memory 1211 may be coupled to the processor 1205 and may comprise a read-only memory (ROM), a random-access memory (RAM), a programmable ROM (PROM), and/or an electrically erasable read-only memory (EEPROM). The memory 1211 may include multiple memory locations for storing, among other things, an operating system, data and variables 1231 for programs executed by the processor 1205; computer programs for causing the processor to operate in connection with various functions such as to host plural different RRS services 1233, to instantiate an RRS dynamically as needed according to the individual RRS ontology 1235, to route a request to the RRS for the unique service indicated in the request etc. 1237, to manage transport connectivity and mutual communication 1239, and to support communication originated from an RRS (as a "client") to another RRS; as well as each of the hosted different unique RRSs (e.g., for service (A) and service (B)) 1243, 1245 which have been instantiated and thus are available. The computer programs may be stored, for example, in ROM or PROM and may direct the processor 1205 in controlling the operation of the computer 1201. Each of these functions is considered in more detail below, to the extent that it is not detailed elsewhere in this document.

Also illustrated are a client/requestor 1217, a provider/server of service (A) 1219, and a provider/server of service (B) 1221. The client/requestor 1217 and provider/servers 1219, 1221 can communicate with each other over the network 1207, and communicate with the computer 1201 over the network 1207 via the I/O interface 1209. It will be appreciated that one or more of the client/requestor and provider/servers 1217, 1219, 1221 may actually be located on the same computer 1201 as the RRS process environment. Furthermore, network 1207, which is illustrated as a wireless network, but may be wired and/or may be an internal bus (if appropriate), or a combination of the foregoing.

Responsive to manual signaling from the user input device represented by the keyboard 1215, in accordance with instructions stored in memory 1211, and/or automatically upon receipt of certain information via the i/o interface 1209 (such as from the client/requestor 1217), the processor 1205 may direct the execution of the stored programs.

The processor 1205 may be programmed to host plural different RRS services 1233, each of which is dedicated respectively to a single different unique service, and each of which is accessible by client and server instances through the same ICL The processor 1205 may be programmed to instantiate an RRS dynamically as needed according to the individual RRS ontology 1235 that provides the framework for processing which is dedicated to the unique service.

The processor 1205 may be programmed to route a request to the RRS for the unique service indicated in the request 1237, and then to route the request through the server instance for the particular service, and then to return the response (from the service) to the client.

The processor 1205 may be programmed to manage transport connectivity and mutual communication 1239 between (i) clients and RRSs, (ii) plural different RRSs, and (RRS and server instances.

The processor 1205 may be programmed to support communication originated from an RRS (as a "client" though much client overhead is omitted) to an RRS which is subordinate. This is discussed above in more detail as the multi-server scenario.

The processor 1205 may be programmed to host the different unique RRSs (e.g., for service (A) and service (B)) 1243, 1245, which have been instantiated and thus are available. The hosted different unique RRS for a service, which performs processing according to the ontology for the unique service, can communicate with the provider/server of the service (A)/(B) 1219, 1221, for example, using known techniques over the I/O interface 1209 and network 1207. Such communications between the computer 1201 and the client/requestor 1217, and between the computer 1201 and the provider/server 1219, 1221, can be over the ICL which is discussed elsewhere herein.

As will be understood in this field, besides the functions discussed above, the memory 1211 can include other miscellaneous information in a miscellaneous data and storage 1247, along with the usual temporary storage and other instructions for other programs not considered herein.

The computer 1201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1205, memory 1211, a disk drive and/or removable storage medium are referred to as "computer-readable storage media" and provide non-transitory storage of computer programs and data.

It should be understood that FIG. 12 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

FIG. 13 provides an illustration of a procedure 1301 for an ontology-based request/reply service. Most of the details implicated by FIG. 13 have been discussed above and are not repeated herein. However, FIG. 13 is useful to illustrate the procedure and provide a more complete understanding.

By way of overview, the procedure 1301 can provide 1303 the RRS environment to host the different RRSs, and can provide 1305 not only transport connectivity but also mutual communication between various components within the RRS environment. In a loop, the procedure 1301 can receive 1307 a request from a client; determine 1309 which RRS corresponds to the unique different service that is indicated in the request; instantiate 1311 the RRS dynamically as needed; route 1313 the request to the RRS, have the request processed, and return a response to satisfy the request; looping 1315 while there are services in the request; and optionally the RRS can send one or more requests as a client (e.g., acting as a multi-service). Each of these is now discussed in more detail, omitting some details previously provided.

The procedure 1301 can provide 1303 the RRS environment to host the different RRSs, to provide connections between pairs of a client instance and server instance of a unique different service, in which each RRS is accessed by client and server instances through the same independent communication layer.

The procedure 1301 can provide 1305 not only transport connectivity but also mutual communication between various components within the RRS environment, specifically, (i) mutual communication between clients and different RRSs, (ii) mutual communication between different RRSs, and (iii) mutual communication between different RRSs and server instances. The phrase "mutual communication" indicates that the components can communicate with each other according to procedures and formats which are mutually known and understood to the components. The transport connectivity and mutual communication can be provided by using the common API and the ICL.

In a loop, the procedure 1301 can receive 1307 a request from a client. Such request from the client indicates a unique service. Generally, the client expects that the request will result in the client receiving a reply that is considered according to usual client-server technology to satisfy the request.

The procedure 1301 can determine 1309 which RRS corresponds to the unique different service that is indicated in the request, and which (if any) of the available RRSs is dedicated to represent the requested unique different service of the request. It is possible that an RRS is available to process the request and is already instantiated, for example, where there is a "bonded" conversation style. In such a situation, the RRS does not need to be re-instantiated.

The procedure 1301 can instantiate 1311 the RRS dynamically in the situation that it is needed, for example, the RRS does not exist or an additional RRS instance is expected, according to an individual RRS ontology (already discussed in detail) that provides the syntactical and semantical framework that establishes processing in the RRS which is dedicated to represent the indicated unique service.

The procedure 1301 can route 1313 the request to the RRS which is now instantiated and which is dedicated to the requested service, have then route the request to the server which will process the request and returns the reply that satisfies the request, and then return the reply that satisfies the request to the client that sent the request.

The procedure 1301 can determine 1315 whether another service is implicated in the request, and then can loop to handle the next request service/RRS while there is another service requested.

If it is determined 1315 that there is no other service requested, then optionally, the RRS can send one or more requests as a client (e.g., acting as a multi-service, performing vertical communications to another RRS, but without much of the client overhead).

Then, the procedure 1301 will loop to receive the next request 1307 from a client, and the processing will continually repeat.

VIII. Glossary

Terms as used herein are intended to be interpreted first, as understood to one of skill in the art at a first level, of publish-subscribe technologies, message-oriented middleware, and ontologies; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The term "ontology" as used herein means a formal representation of knowledge about a domain as a set of concepts within the domain, using a shared formal vocabulary to denote the types, properties, and interrelationships of these concepts that exist in the domain; further, the ontology defines the vocabulary with which queries and assertions are exchanged among entities within the domain.

The following is provided to illustrate the definition. Common components of ontologies may include one or more of:

Individuals: instances or objects (the basic or "ground level" objects).

Classes: sets, collections, concepts, classes in programming, types of objects, or kinds of things.

Attributes: aspects, properties, features, characteristics, or parameters that objects (and classes) can have.

Relations: ways in which classes and individuals can be related to one another.

Function terms: complex structures formed from certain relations that can be used in place of an individual term in a statement.

Restrictions: formally stated descriptions of what must be true in order for some assertion to be accepted as input.

Rules: statements in the form of an if-then (antecedent-consequent) sentence that describe the logical inferences that can be drawn from an assertion in a particular form.

Axioms: assertions (including rules) in a logical form that together comprise the overall theory that the ontology describes in its domain of application. This definition differs from that of "axioms" in generative grammar and formal logic. In those disciplines, axioms include only statements asserted as a priori knowledge. As used here, "axioms" also include the theory derived from axiomatic statements.

Events: the changing of attributes or relations.

An ontology might (but need not) comprise rules, however, an ontology is much more than just a rule system because it necessarily comprises types, properties and inter-relationships of those concepts, thus modeling semantics of a selected subset of the real or a virtual world. An ontology may be encoded using conventional techniques, for example provided by ontology languages.

The term "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

IX. Implementation and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation.

Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for ontology based request/reply service within a multi-channel message oriented middleware stack have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system for an ontology-based request/reply service (RRS), comprising:
    a storage which is configured to store an RRS ontology; and
    a processor cooperatively operable with the storage, and configured to:
        host a plurality of different request/reply services (RRS), each different RRS is dedicated to represent a different unique service and to provide connections from a client to a server instance of the different unique service, each different RRS is accessible by client instances and server instances through a same independent communication layer (ICL) that handles different transport protocols between different platforms;
        receive, from the client through the ICL, a request that indicates a unique service and determine which RRS of the different RRSs is dedicated to represent the unique service which is indicated in the request;
        determine whether the RRS, that is dedicated to represent the unique service indicated in the request, is already instantiated and available for communications with the client, so as to not re-instantiate the RRS,
        instantiate an RRS of one of the different RRSs which is determined to not be already instantiated and available for communications, the RRS being instantiated according to an individual RRS ontology stored in the RRS ontology, wherein the individual RRS ontology provides a syntactical and semantical framework to establish processing which is dedicated to represent the unique service, wherein the one of the different RRSs has a plurality of subordinate RRSs instantiated corresponding to each of a plurality of unique services;
        route the request which is received by the one RRS to the instantiated RRS of the different RRSs which is the subordinate RRS and is determined to be dedicated to represent the unique service which is indicated in the request, and then route the request through a server instance corresponding to the unique service indicated in the request to the subordinate RRS, to process the request and to return, from the subordinate RRS via the one RRS to the client, a response to satisfy the request; and
        manage transport connectivity and mutual communication between a plurality of clients and the plurality of different RRSs, mutual communication between the plurality of different RRSs, and mutual communication between the plurality of different RRSs and a plurality of server instances.

2. The system of claim 1, wherein the processor is further configured to remove one or more of the plurality of different RRSs when no longer needed to process requests.

3. The system of claim 1, wherein the RRS ontology is configured to cause the instantiated RRS to support a plurality of parallel requests through the plurality of server instances all dedicated to the unique service.

4. The system of claim 1, wherein the RRS ontology is configured to cause the RRS to limit responses to the client request to a predefined maximum number of responses, when the client request is to the plurality of server instances which cause more than the predefined maximum number of responses to the client request.

5. The system of claim 1, wherein
    the individual RRS ontology in the RRS ontology causes the instantiated RRS to act as a client that communicates requests to and receives replies from at least one of the different RRSs.

6. The system of claim 1, wherein the processor is further configured to manage requests and replies between the plurality of clients and the plurality of different RRSs according to pre-defined different types of conversation styles.

7. The system of claim 1, wherein the RRS is further configured to receive registration from the server instance, wherein the registration includes an indication of a rollback strategy in the event that the server instance disconnects while processing at least one unfinished request.

8. The system of claim 1, wherein each different RRS is accessible through a common application programming interface (API) which is common to all of the different RRSs.

9. A method for an ontology-based request/reply service (RRS), comprising:
    hosting, by a processor, a plurality of different request/reply services (RRS), each different RRS is dedicated to represent a different unique service and to provide connections from a client to a server instance of the different unique service, each different RRS is accessible by client instances and server instances through a same independent communication layer (ICL) that handles different transport protocols between different platforms;
    receiving, by the processor from the client through the ICL, a request that indicates a unique service and determine which RRS of the different RRSs is dedicated to represent the unique service which is indicated in the request;

determining whether the RRS, that is dedicated to represent the unique service indicated in the request, is already instantiated and available for communications with the client, so as to not re-instantiate the RRS, instantiating, by the processor, an RRS of one of the different RRSs which is determined to not be already instantiated and available for communications, the RRS being instantiated according to an individual RRS ontology stored in an RRS ontology provided in a storage, wherein the individual RRS ontology provides a syntactical and semantical framework to establish processing which is dedicated to represent the unique service, wherein the one of the different RRSs has a plurality of subordinate RRSs instantiated corresponding to each of a plurality of unique services;

routing, by the processor, the request which is received by the one RRS, to the instantiated RRS of the different RRSs which is the subordinate RRS and is determined to be dedicated to represent the unique service which is indicated in the request, and then routing, by the processor, the request through a server instance corresponding to the unique service indicated in the request to the subordinate RRS, to process the request and then returning, from the subordinate RRS via the one RRS to the client, a response to satisfy the request; and managing, by the processor, transport connectivity and mutual communication between a plurality of clients and the plurality of different RRSs, mutual communication between the plurality of different RRSs, and mutual communication between the plurality of different RRSs and a plurality of server instances.

10. The method of claim 9, further comprising removing, by the processor, one or more of the plurality of different RRSs when no longer needed to process requests.

11. The method of claim 9, wherein the RRS ontology is configured to cause the instantiated RRS, executing by the processor, to support a plurality of parallel requests through the plurality of server instances all dedicated to the unique service.

12. The method of claim 9, wherein the RRS ontology is configured to cause the RRS, executing by the processor, to limit responses to the client request to a predefined maximum number of responses, when the client request is to the plurality of server instances which cause more than the predefined maximum number of responses to the client request.

13. The method of claim 9, wherein
the individual RRS ontology in the RRS ontology causes the instantiated RRS, when executing by the processor, to act as a client that communicates requests to and receives replies from at least one of the different RRSs.

14. The method of claim 9, further comprising managing, by the processor, requests and replies between the plurality of clients and the plurality of different RRSs according to pre-defined different types of conversation styles.

15. The method of claim 9, further comprising receiving, by the RRS on the processor, registration from the server instance, wherein the registration includes an indication of a rollback strategy in the event that the server instance disconnects while processing at least one unfinished request.

16. The method of claim 9, further comprising providing, by the processor, accessibility to each different RRS through a common application programming interface (API) which is common to all of the different RRSs.

17. A non-transitory computer readable medium comprising executable instructions for a method for an ontology-based request/reply service (RRS), the instructions being executed by a processor to perform:

providing a storage which is configured to store an RRS ontology;

hosting a plurality of different request/reply services (RRS), each different RRS is dedicated to represent a different unique service and to provide connections from a client to a server instance of the different unique service, each different RRS is accessible by client instances and server instances through a same independent communication layer (ICL) that handles different transport protocols between different platforms;

receiving, from the client through the ICL, a request that indicates a unique service and determine which RRS of the different RRSs is dedicated to represent the unique service which is indicated in the request;

determining whether the RRS, that is dedicated to represent the unique service indicated in the request, is already instantiated and available for communications with the client, so as to not re-instantiate the RRS, instantiating an RRS of one of the different RRSs which is determined to not be already instantiated and available for communications, the RRS being instantiated according to an individual RRS ontology stored in the RRS ontology provided in the storage, wherein the individual RRS ontology provides a syntactical and semantical framework to establish processing which is dedicated to represent the unique service, wherein the one of the different RRSs has a plurality of subordinate RRSs instantiated corresponding to each of a plurality of unique services;

routing the request which is received by the one RRS to the instantiated RRS of the different RRSs which is the subordinate RRS and is determined to be dedicated to represent the unique service which is indicated in the request, and then routing the request through a server instance corresponding to the unique service indicated in the request to the subordinate RRS, to process the request and then returning, from the subordinate RRS via the one RRS to the client, a response to satisfy the request; and managing transport connectivity and mutual communication between a plurality of clients and the plurality of different RRSs, mutual communication between the plurality of different RRSs, and mutual communication between the plurality of different RRSs and a plurality of server instances.

18. The non-transitory computer readable medium of claim 17, further comprising removing one or more of the plurality of different RRSs when no longer needed to process requests.

19. The non-transitory computer readable medium of claim 17, wherein the RRS ontology is configured to cause the instantiated RRS to support a plurality of parallel requests through the plurality of server instances all dedicated to the unique service.

20. The non-transitory computer readable medium of claim 17, wherein the RRS ontology is configured to cause the RRS to limit responses to the client request to a predefined maximum number of responses, when the client request is to the plurality of server instances which cause more than the predefined maximum number of responses to the client request.

* * * * *